United States Patent [19]
Ploshkin

[11] Patent Number: 5,653,404
[45] Date of Patent: Aug. 5, 1997

[54] DISC-SHAPED SUBMERSIBLE AIRCRAFT

[76] Inventor: Gennady Ploshkin, 5987 Chippewa Rd., R.R. #5, Duncan, B.C., Canada, V9L 4T6

[21] Appl. No.: 422,897

[22] Filed: Apr. 17, 1995

[51] Int. Cl.$^6$ .................... B64C 29/00; B64C 11/46; B64C 27/10
[52] U.S. Cl. .................... 244/12.2; 244/15; 244/23 C; 244/69; 244/73 C; 244/91
[58] Field of Search .................... 244/12.2, 12.4, 244/12.5, 15, 23 R, 23 B, 23 D, 67, 69, 73 C, 91, 23 C; 119/312, 337, 338

[56] References Cited

U.S. PATENT DOCUMENTS

| | | | |
|---|---|---|---|
| 2,863,621 | 12/1958 | Davis | 244/23 R |
| 2,935,275 | 5/1960 | Grayson | 244/23 R |
| 3,018,068 | 1/1962 | Frost et al. | 244/15 |
| 3,034,747 | 5/1962 | Lent | 244/23 |
| 3,041,012 | 6/1962 | Gibbs | 244/17.23 |
| 3,067,967 | 12/1962 | Barr | 244/12.2 |
| 3,123,320 | 3/1964 | Slaughter | 244/23 C |
| 3,312,425 | 4/1967 | Lennon et al. | 244/12.2 |
| 3,606,570 | 9/1971 | Haggerty | 416/2 |
| 3,774,865 | 11/1973 | Pinto | 244/23 C |
| 4,014,483 | 3/1977 | MacNeill | 244/23 C |
| 5,039,031 | 8/1991 | Valverde | 244/12.2 |
| 5,064,143 | 11/1991 | Bucher | 244/23 C |
| 5,213,284 | 5/1993 | Webster | 244/23 C |
| 5,303,879 | 4/1994 | Bucher | 244/23 D |

Primary Examiner—Andres Kashnikow
Assistant Examiner—Virna Lissi Mojica
Attorney, Agent, or Firm—Thomas W. Secrest

[57] ABSTRACT

An aircraft of disc-shaped configuration provides the capability of vertical take-off and landing; straight horizontal flight; and three-dimensional maneuverability in the air by means of a plurality of counter-rotating lifting rotors assembled of fixed pitch or of self-adjusting pitch aerofoil blade elements; and, submersibility of the aircraft in water is achieved by means of a marine propulsion module using two counter-rotating hydrofoil rotors for up or down thrust, and a tunneled conventional marine propeller for horizontal travel. The marine propulsion module is detachable for emergency and for use with the main frame aircraft of a variety of other detachable modules for different tasks and missions. Exceptionally adaptable for any existing power plant, including nuclear, it is best suited for the environment-friendly types, like integrated steam motor on hydrogen and oxygen burning. The simplicity of the design and its mechanical efficiency are combined with several novel safety features, while displaying an attractive technological continuity for any conventional aircraft manufacturer. The downstream of air from the lifting rotors utilized for maneuvering by a system of vanes positioned below the rotors.

86 Claims, 11 Drawing Sheets

DISC-SHAPED SUBMERSIBLE AIRCRAFT

STATEMENT AS TO RIGHTS TO INVENTIONS MADE UNDER FEDERALLY-SPONSORED RESEARCH AND DEVELOPMENT (if any)

This invention was conceived and developed to the present state with private money and without any financial assistance from the federal government.

CROSS-REFERENCE TO RELATED APPLICATIONS

There is an Integrated Steam Motor, pending U.S. patent application Ser. No. 08/103,546 of Aug. 9, 1993. This steam motor will be referred to as the best power source for the SUBMERSIBLE AIRCRAFT. However, this aircraft is not limited to any particular type of prime mover. Moreover, one of the advanced features of the aircraft is its adaptability to a wide variety of existing power plants.

BACKGROUND OF THE INVENTION

(1) Field of the Invention

The present invention relates to aircraft and, more particularly, to aircraft with vertical take-off and landing capability having counter-rotating rotors. Among the most successful concepts derived from the pursuit of an idea of aircraft of similar capabilities is the helicopter. Known for several severe disadvantages, the helicopter remains as primitive and inefficient in its use of power as it was at its inception. The most mechanically efficient way to turn a rotor for vertical flight would be not at its axis as in helicopter, but at the periphery similar to a starter turning a large flywheel of an engine. This approach dramatically improves the design of vertical take-off and landing aircraft in its variety adding a number of capabilities unattainable by helicopter concept.

Presently, there is considerable interest in providing improved types of vertical take-off and landing aircraft for wide variety of purposes, especially those which are energy-efficient and, therefore, environment and people-friendly.

The present invention relates to aircraft and, more particularly, to aircraft with vertical take-off and landing capability; three-dimensional freedom maneuverability in the air; and, three-dimensional freedom maneuverability in the water. Among the most successful concepts derived from the pursuit of an idea of aircraft of similar capabilities is the helicopter. Since first conceived by Leonardo da Vinci over 500 years ago, the idea of "screwing-up into the air with the help of the Archimedean (287-212 B.C.) screw", remains the most popular among aircraft manufacturers. This is so, regardless how mechanically inefficient and limited in performance, not to mention the technological costs, the helicopter remains. In my opinion, the most mechanically efficient, and, therefore, most economical way to turn a rotor for vertical lift-off, is not at its axis (da Vinci's idea used in helicopters), but at the periphery of the rotor. The way relatively small electric starters manage to turn multi-cylinder engines is to apply the torque to the outside rim of a large diameter flywheel as evidenced by a starter on a flywheel of an internal combustion engine. This results in "better leverage." This approach to the design of a vertical take-off and landing aircraft appears to be a radical departure from da Vinci's concept. However, torque applied at the periphery of the rotor rewards this new aircraft concept with major capabilities unattainable by the helicopter concept of an Archimedean screw. Therefore, the field of this invention is a multipurpose aircraft with V.T.O.L. (vertical take-off and landing) capabilities; three-dimensional maneuverability; capable of landing on water; and, operating underwater with three-dimensional freedom. This invention is superior to helicopters and any prior art in any size, powered by any engine. Simultaneously, it remains technologically less costly, easier, safer and more enviromental-friendly and people-friendly.

The present invention provides an improved aircraft of the above-mentioned type capable of performing hovering flight with controlled translational and vertical movement in all directions and also having good flight abilities in horizontal flight. This invention also provides an aircraft with counter-rotating rotors synchronized and balanced to eliminate any residual torque which would otherwise tend to spin the aircraft around its central axis. The rotors coaxially rotating inside each other at even speed provide an upward thrust and assembled of individual aerofoil blade units in a chain-link simple fashion. The aerofoil blades of the lifting rotors are of two types: with a fixed pitch and with a self-adjusting pitch. An aircraft constructed according to this invention may have fixed pitch aerofoil blades in its lifting rotors, or self-adjusting aerofoil blades, or a combination of both of these features. Apart from a favorable gyro-stabilizing effect of the counter-rotating rotors upon the aircraft, this invention provides an aircraft with a high mechanical efficiency at a comparatively lower technological cost than a conventional helicopter. This is so whether it is an ultra-light motocycle engine-powered model, or a nuclear-powered heavy lifting capacity multi-purpose aircraft constructed according to this invention.

(2) Description of the Related Art

The attempts to imitate U.F.O.s (unidentified flying objects) in shape, speed and maneuverability have been made by various inventors of, perhaps, many nationalities long before the phenomena was widely publicized. The Austrian inventor, Viktor Schauberger, had his "Schriever-Habermohl" flying disc, reportedly, in 1944. It was reported that this flying disc could climb vertically up to 12,000 meters in 3.12 minutes and could fly horizontally at a speed of 2,000 km/hr. It had a diameter of 1.5 meters, weighed 135 kg, and was started by an electric motor of 1/20 horsepower. The American and Russian scientists, familiar with Viktor Schauberger's experiments, did not develop these Schauberger's flying disc into a commercial success or are using his ideas for developing secret weaponry.

Until the force of gravity is fully manageable for commercial use, the dreamers, like myself, will keep trying to imitate the legendary spacecrafts. In this area of endeavor and among the patents found in my patentability research, there are two relevant patents, viz., Franz Bucher, U.S. Pat. No. 5,064,143, and Steven Webster, U.S. Pat. No. 5,213,284. Both inventors offer a rather complex engineering solution for the use of lifting rotors. The result is a product of a high technological cost and a low reliability. Apart from the fact that these inventors use counter-rotating lifting rotors for vertical take-off and landing, and vane systems, positioned below said rotors, to provide maneuverability, their patents and teachings are not in conflict in any way or form with the present invention.

PRIOR ART

Prior to preparing this patent application, I made this search of the patent art at the Sunnyvale Patent Library, Sunnyvale, Calif., as well as at the University of British Columbia, Vancouver, Canada, and found the following interesting patents:

| PATENTEE | PATENT NUMBER | YEAR |
| --- | --- | --- |
| DAVIS | 2,863,621 | 12/1958 |
| GRAYSON | 2,935,275 | 3/1960 |
| FROST, et al | 3,018,068 | 1/1962 |
| LENT | 3,034,747 | 5/1962 |
| GIBBS | 3,041,012 | 6/1962 |
| BARR | 3,067,967 | 12/1962 |
| SLAUGHTER | 3,123,320 | 3/1964 |
| LENNON, et al | 3,312,425 | 4/1967 |
| HAGGERTY | 3,606,570 | 9/1971 |
| PINTO | 3,774,865 | 11/1973 |
| MACNEILL | 4,014,483 | 3/1977 |
| BUCHER | 5,064,143 | 11/1991 |
| VALVERDE | 5,039,031 | 8/1991 |
| WEBSTER | 5,213,284 | 5/1993. |

In reviewing these patents, I have found that none of the above-noted patents, either singularly or in combination, are seen to disclose the specific arrangement of concepts disclosed by the present invention.

SUMMARY OF THE INVENTION

There is disclosed an aircraft capable of movement in three directions, in Cartesian coordinate terms the x-y-z directions, in the air. The movement can be a combination of vertical and horizontal.

The aircraft comprises a frame, an engine or power plant and two counter-rotating rotors. The engine or power plant through suitable gearing rotate simultaneously the two counter-rotating rotors. There are vanes for vertically positioning and horizontally positioning the aircraft.

Further, this aircraft is submersible in water. This aircraft can move on water or below the surface of the water. The aircraft has three-dimensional movement in the water such has in the x-y-z directions. The aircraft can have various horizontal positions and also various depth positions in the water. The aircraft can move in the water, on the water and in the air.

OBJECTS AND ADVANTAGES

A primary object of this invention is to provide an aircraft of the above-mentioned characteristics and capable of performing movements with three-dimensional freedom and designed speed while retaining horizontal stability at all times, either in hovering over one spot, or flying unidirectionally at a maximum speed.

Another object of the invention is to provide an aircraft adaptable to many existing engines or power plant types, including nuclear power, while best suited for environment-friendly Hydrogen fired Integrated Steam Motor (pending U.S. patent application Ser. No. 08/103,546 of Aug. 9, 1993) offering quiet, vibration-free, exceptionally reliable service for both aero- and underwater operation;

A further object of this invention is to provide an aircraft capable of operating quieter than any existing rotary wing aircraft type by lowering the speed of rotation of the lifting rotors while spreading the load on a larger number of aerofoil blades of higher aspect ratio;

Still another object of this invention is to provide an aircraft with such a mechanical efficiency and lifting capacity as to be suitable for a nuclear power plant as its prime mover which would be providing an unlimited operational range in the air unattainable by conventional aircraft.

A still further object of this invention is to provide an aircraft of such exceptional inherent stability, derived from the gyro-stabilizing effect of its counter-rotation lifting rotors, as to assure its safe and reliable operation in practically any weather conditions in search and rescue missions, for example, over the sea;

Still another object of this invention is to provide an aircraft with outstanding survivability characteristics, featuring a detachable, in emergency, parachutable module of a marine propulsion unit, combined with power plant and fuel tanks, and other heavy items; also, including an automatically inflatable balloon/parachute combination, stored in the emergency gear compartment under the dome-like hood;

Still another object of this invention is to provide an aircraft of such technological continuity as to allow any conventional aircraft manufacturer switch to its production without major re-tooling and workforce re-training;

Yet another object of this invention is to provide an aircraft of such simplicity of construction and operation as to allow its owners/operators to switch to, let us say, scheduled operation of this aircraft with a minimum of retraining of conventional aircraft pilots and ground crews, while enjoying low operating costs, maximum safety and reliability;

Another object of this invention is to provide an aircraft of such low production and operating costs, simplicity, safety and dependability in its basic non-submersible version as to become a consumer means of mass and personal transportation comparable to the automobile;

Another object of this invention is to provide an aircraft adaptable to any, whichever is more suitable for the size and service type of the aircraft, power transmission drives within the craft, from a simple mechanical to hydraulic, electrical and even magnetic drives;

Yet another object of this invention is to provide an aircraft adaptable to a variety of detachable modules designed specifically for a particular task, or mission; such as marine propulsion, jet-propulsion, heavy lifting, fire-fighting, and so on, each detachable module having a different prime mover and fuel capacity, and type of landing gear;

Still another object of this invention, is to provide an aircraft with such a high mechanical efficiency and simplicity of design that allows a wide variation of its size from an ultra-light to a nuclear-powered inter-continental carrier without sacrifice of simplicity, reliability, mechanical efficiency and safety;

A further object of this invention is to provide an aircraft with underwater operational capabilities and underwater maneuverability presently affordable only by specialized submersible boat types, without complicating and sacrificing its aircraft capabilities and related hardware;

Another object of this invention is a self-adjustable aerofoil blade element connected to other blade elements in a chain-link fashion to comprise the lifting rotor. The self-adjustable pitch mechanism is simple, reliable, technologically cost-effective and requires minimum power at the aircraft start-up time, because all the aerofoil blades of the rotor would be positioned at zero pitch (no lifting thrust produced) for lack of centrifugal forces in the lifting rotor. Similarly, the chain-link fashion of assembling aerofoil and hydrofoil rotors for the aircraft of the present invention is a simple, reliable and technologically cost-effective way of assembling large and very large aerofoil and hydrofoil rotors, it also greatly reduces manufacturing and maintenance costs of such rotors.

Other and further features and objects of the invention will be more apparent to those skilled in the art upon a consideration of the appended drawings and the following description wherein a constructional form of apparatus for carrying out the invention is disclosed;

Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

DESCRIPTION OF THE PREFERRED EMBODIMENTS

Figure 1:
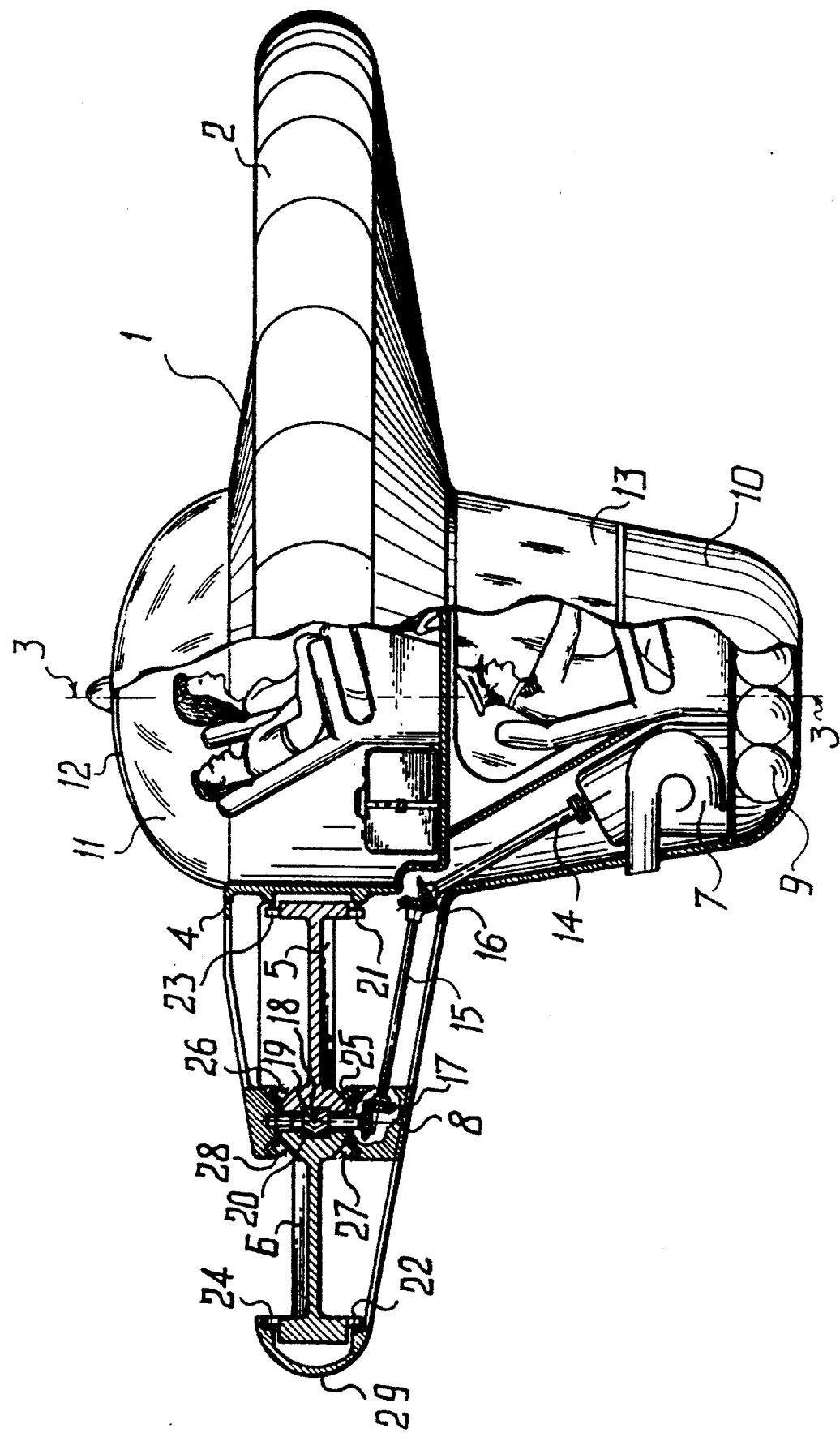
FIG. 1 is a fragmentary vertical cross-sectional view of the aircraft embodying this invention constructed with a conventional mechanical power transmission as a limited range public transportation vehicle.
Figure 2:
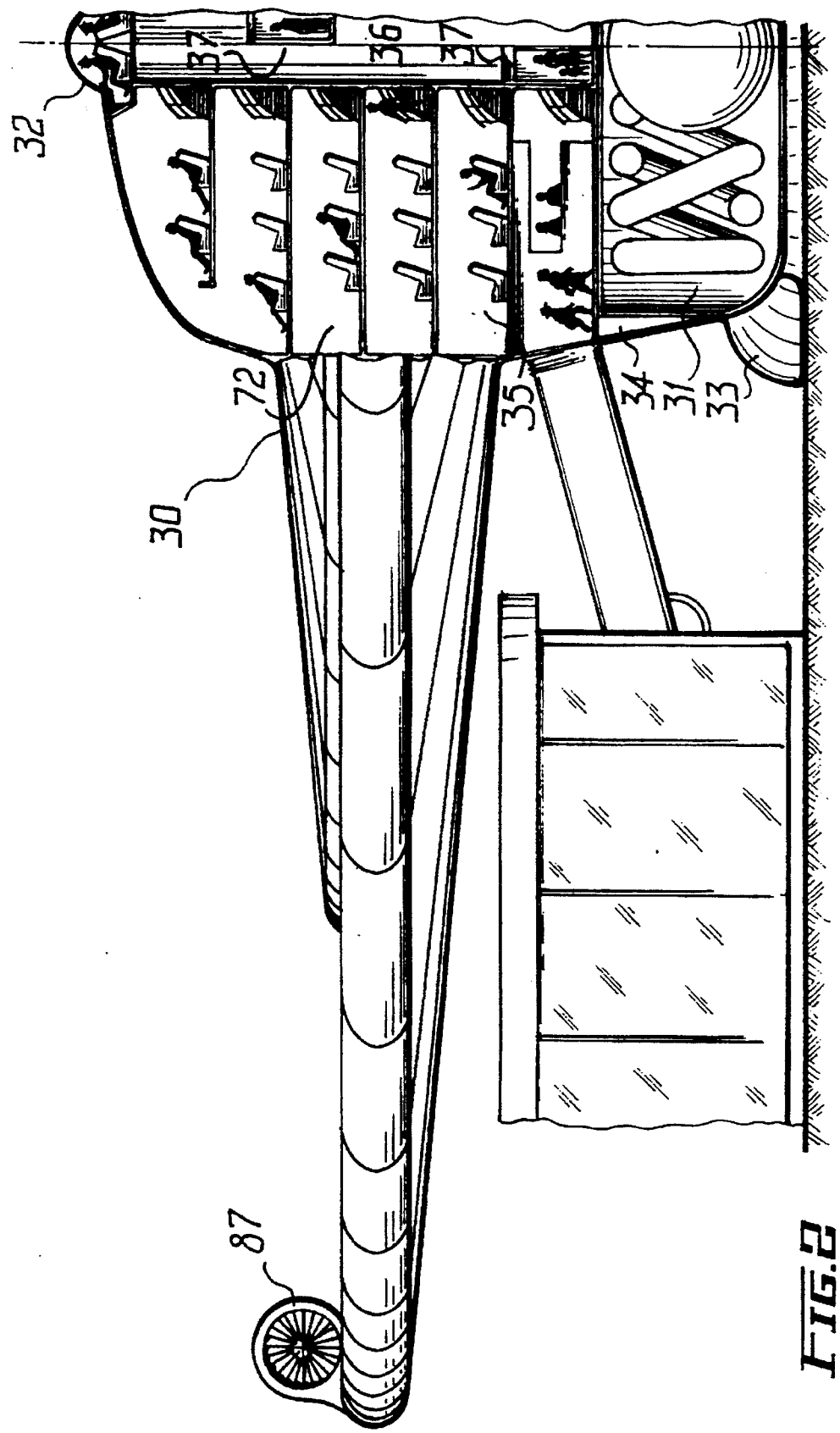
FIG. 2 is a fragmentary vertical cross-sectional view through a half of a nuclear-powered intercontinental passenger aircraft constructed in accordance with the teachings of this invention.

With reference to the drawings, wherein like reference characters designate identical or corresponding parts, and more particularly to FIG. 1 the reference numeral 1 generally indicates one form of a heavier-than-air aircraft embodying this invention. The aircraft 1, is comprised of a disk-shaped structure 2 which is substantially symmetrical about a vertical axis 3. The disc-shaped structure 2 consists of a main frame 4, which integrates and carries counter-rotating lifting rotors 5 and 6, a prime mover 7 with a power transmission 8, fuel tank 9, a pilothouse 10, and a payload compartment 11 covered with a weather-proof, transparent cover 12, in which the pilothouse 10 is fitted with a weather-proof panoramic window 13. The mechanical power transmission 8, conveys a needed torque from the prime mover 7, via the power train comprising shafts 14 and 15, and bevel gears 16 and 17, to a speed-synchronizing gear 18, which drives the coaxial lifting rotors 5 and 6, in opposite directions at an equal speed by means of toothed bands cut into rims 19 and 20 of the lifting rotors 5 and 6. The weight of the lifting rotors 5 and 6 is supported by means of carrier bearings 21 and 22, fitted to the main frame 4, at several evenly spaced points around the main frame 4, while the upward thrust from the lifting rotors 5 and 6, when they rotate, is conveyed to the aircraft via thrust bearings 23 and 24, also fitted to the main frame 4, at the points directly opposite the carrier bearing 21 and 22. While the carrier bearings 21 and 22, and the thrust bearings 23 and 24, restrict the up and down movement of the lifting rotors 5 and 6, they allow some expansion, due to a temperature change, of the rotors outwardly and toward the center of their rotation. Also, to maintain an optimum clearance between toothed rims 19 and 20, and the speed synchronizing gear 18, intermeshing with both, bearings 25, 26, 27 and 28, are fitted to the main frame 4, which also extends into a protective semi-toroidal bumper 29, guarding the lifting rotors from damage in a mid-air collision, etc. Propulsion means for horizontal flight and three-dimensional maneuvering of the aircraft 1 are not shown on FIG. 1 of a general arrangement and power transmission to the lifting rotors, so that the simplicity of the basic idea of a vertical take-off and landing aircraft adaptable to a variety of means for horizontal flight and maneuvering would not be obscured at this point. Also, an aircraft constructed according to the invention may have more than just two counter-rotating lifting rotors as shown on FIG. 1, in which case other considerations of improving the mechanical and aerodynamic efficiency of an aircraft would be taken into account. What will remain the same or closely comparable is an exceptional stability of an aircraft constructed according to this invention due to its always low center of gravity along its center of rotation—vertical axis 3, on one hand, and due to the gyro-stabilizing effect of the lifting rotors 5 and 6, or more, on another. While FIG. 1 illustrates a basic form of an aircraft embodying this invention, shown in flight, FIG. 2, represents a nuclear-powered long-range embodiment 30, on its air-cushion type landing gear 33, loading at an airport. Despite the apparent difference in size, the aircraft 30 is in many ways identical to the aircraft of FIG. 1, in which the hollow cylindrical space 72 around the vertical axis 3, is also utilized for carrying a pilothouse 32, a payload (passenger accommodation) compartment 35, and a detachable and parachutable (for emergency landing) power plant module 31. Adding to the rigidity of a main frame 34, there is a tubular elevator shaft 36, with two elevator cars 37, for convenience of the passengers and crew. A simple and reliable, easily stored in-flight air-cushion landing gear 33, is best suited for this type of aircraft.

Figure 3:
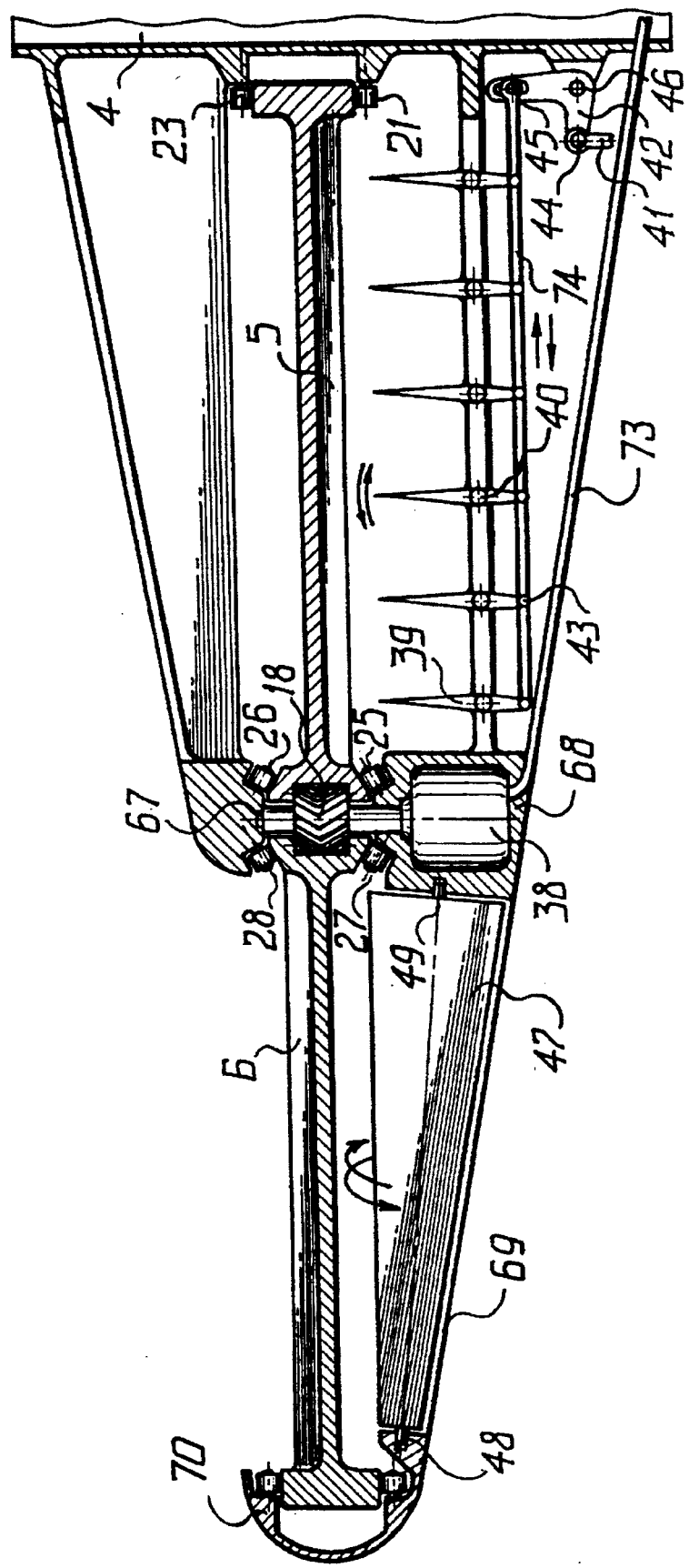
FIG. 3 is a partial cross-sectional view of counter-rotating lifting rotors with a speed-synchronizing gear drive and also showing maneuvering vanes.
Figure 4:
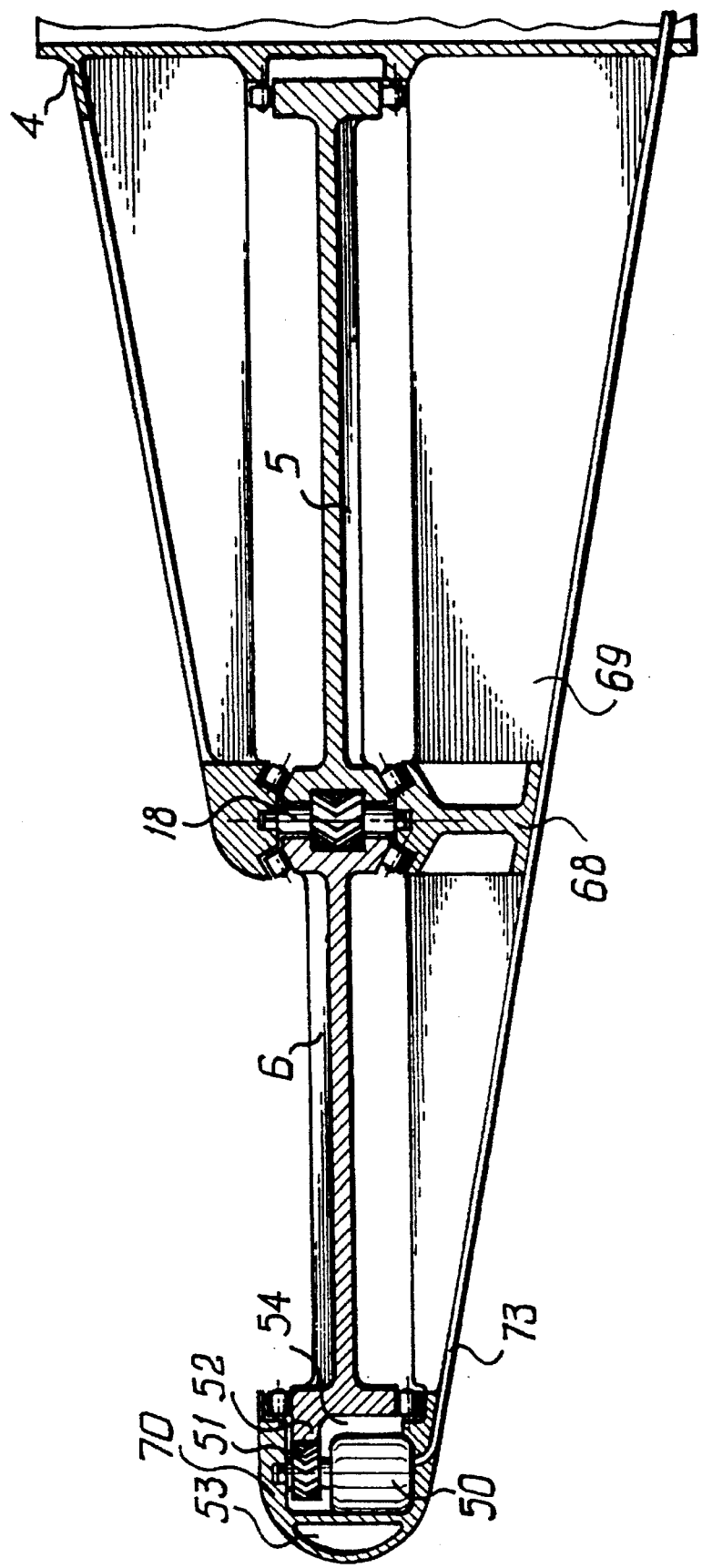
FIG. 4 is a partial cross-sectional view of counter-rotating lifting rotors with a driving gear intermeshing with the outside rim of the outside (largest of the two) lifting rotors.
Figure 5:
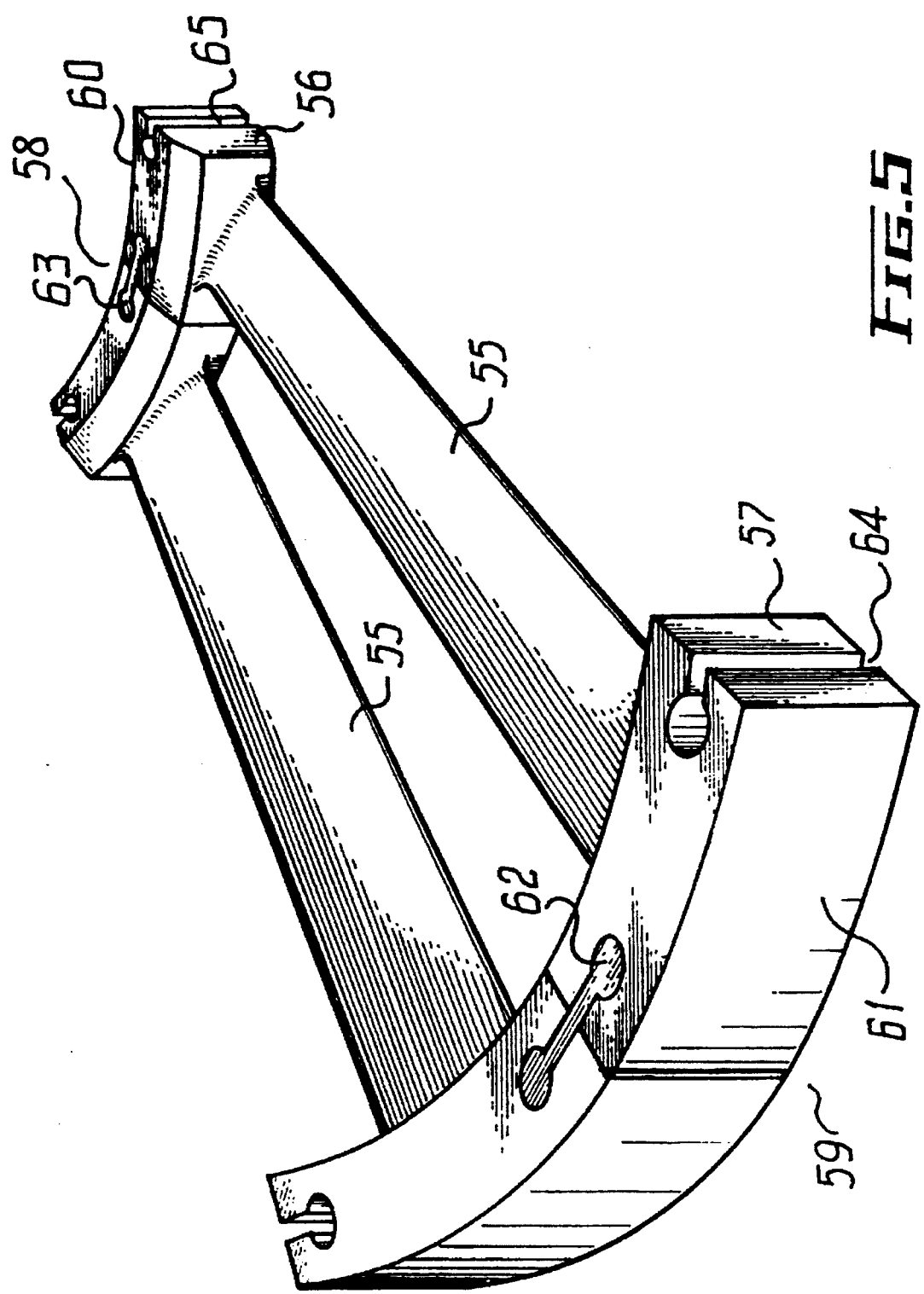
FIG. 5 is a perspective view of two typical fixed-pitch aerofoil blade elements for a lifting rotor and one of the ways to chain-link them into a rotor assembly.

A lifting rotor drive mechanism and a horizontal flight and maneuvering vanes arrangement suitable for either aircraft 1 and 30, are depicted in great detail on FIG. 3. Also shown a hydraulic (or electric) transmission motor 38 with its power (fluid or electric) connection 73 from a prime mover. Horizontal flight of an aircraft constructed according to the invention is achieved by directing some of the downflow of air or fluid from the lifting rotors into a substantially horizontal stream opposite to a course chosen by the pilot. This being achieved by means of a system of vanes 39, pivoted on pins 40, fitted into the main frame 4, and controlled, manually or via servo motors, by the pilot with the help of control rods 41 and 74, linked together into a system by pins 43, 44, 45, 46 and a lever 42. The number and arrangement of the horizontal flight maneuvering vanes would differ from one aircraft to another, or absent altogether when substituted by an outside mounted propulsion device. However, the simplicity and effectiveness of vane systems in providing an immediate thrust in any direction of 360-degree circle of the aircraft would still be superior considering technological and other costs of external jet propulsion. A turning vane 47, pivoted at its axis pins 48 and 49, allows the pilot of an aircraft to turn his craft around its vertical axis 3, either slow or fast, for only a few degrees or in a complete circle, as for example of having a panoramic view while hovering over one spot or flying in one direction. Again, the number of these vanes may differ from one embodiment of the invention to another, while their simplicity and effectiveness remains the same. Referring now to FIG. 4, representing the most mechanically advantageous drive for the lifting rotors 5 and 6, the way it is accomplished in the internal combustion engine starting gear, when a relatively small starter overcomes tremendous opposition of compression in, for example, a multi-cylinder Diesel. Whether hydraulic or electrical transmission is employed, a driving motor 50, may either be hydraulic or electric. It provides a turning torque to a toothed rim 52, of the lifting rotor 6, by means of a gear wheel 51, fitted to the shaft of the driving motor 50. In this preferred embodiment of the lifting rotor drive the speed-synchronizing gear 18, continues to play as an important link in the power transmission conveying a torque from the lifting rotor 6 to 5, and further down toward the center of an aircraft to as many coaxial counter-rotating lifting rotors as there may be embodied according to the invention. Among other power transmission drives with high mechanical efficiency suitable for this system would be a linear induction motor fitted into a circular space 54 of the main frame 4, and turning the rim 52 of the lifting rotor 6, magnetically, rather than mechanically. A circular void space 53, apart from being a good protective cover and bumper, could be used for storing an inflatable toroid ring for emergency landings to increase a parachute area of the descending aircraft constructed according to the invention, and also increase the buoyancy of same aircraft doing an emergency landing on water surface, for example. Also the void space 53 could be filled with a fire retardant for arresting ignition in a crash, or collision situation. With reference to FIG. 5 there are shown two identical aerofoil blade elements 55 of fixed pitch as compared to a variable, controllable, adjustable or somehow else regulated pitch. With minor variations from one lifting rotor to another for one or another aircraft constructed according to the invention, this is the principal novelty around which the present invention evolves. The simplicity of assembling rotors in chain-link fashion out of identical aerofoil blade elements extends further into the simplicity of maintenance, replacement of damaged ones, balance of the rotors, etc. And, as the result, out of simplicity come higher mechanical efficiency, lower technological cost and the overall cost efficiency of an aircraft constructed according to the invention, from its manufacturing to its operation. Returning now to FIG. 5, there are hubs 56 and 57 of the blade element 55, which, when linked to other identical elements by bonds 62 and 63, form an inner rim 58 and an outer rim 59 of a lifting rotor. Surfaces 60 and 61 would normally carry either cut-in gear teeth, friction groves or, if it is an outer rim of the outside (largest in the system) rotor with a magnetic drive, elements of a linear induction motor, or any other adaptable power transmission means. The shape and positioning of the bonds 62 and 63 would differ from one embodiment of this invention to another, but the simplicity and rigidity of the assembly will remain.

Figure 6:
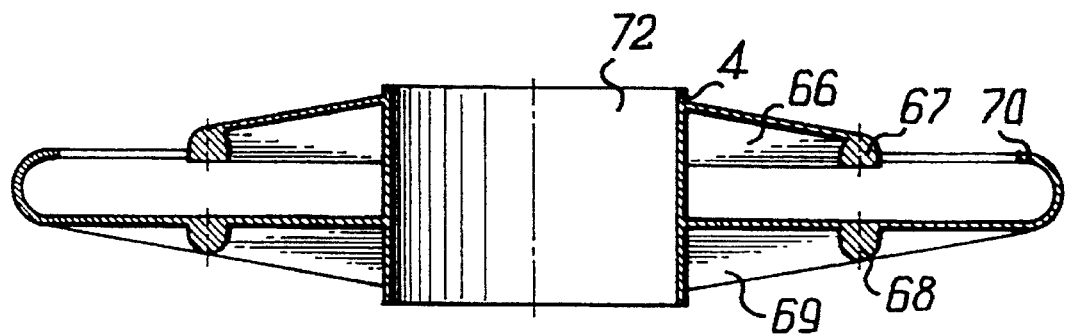
FIG. 6 is a cross-sectional vertical view of the main frame for a typical aircraft constructed according to the teachings of this invention.
Figure 7:
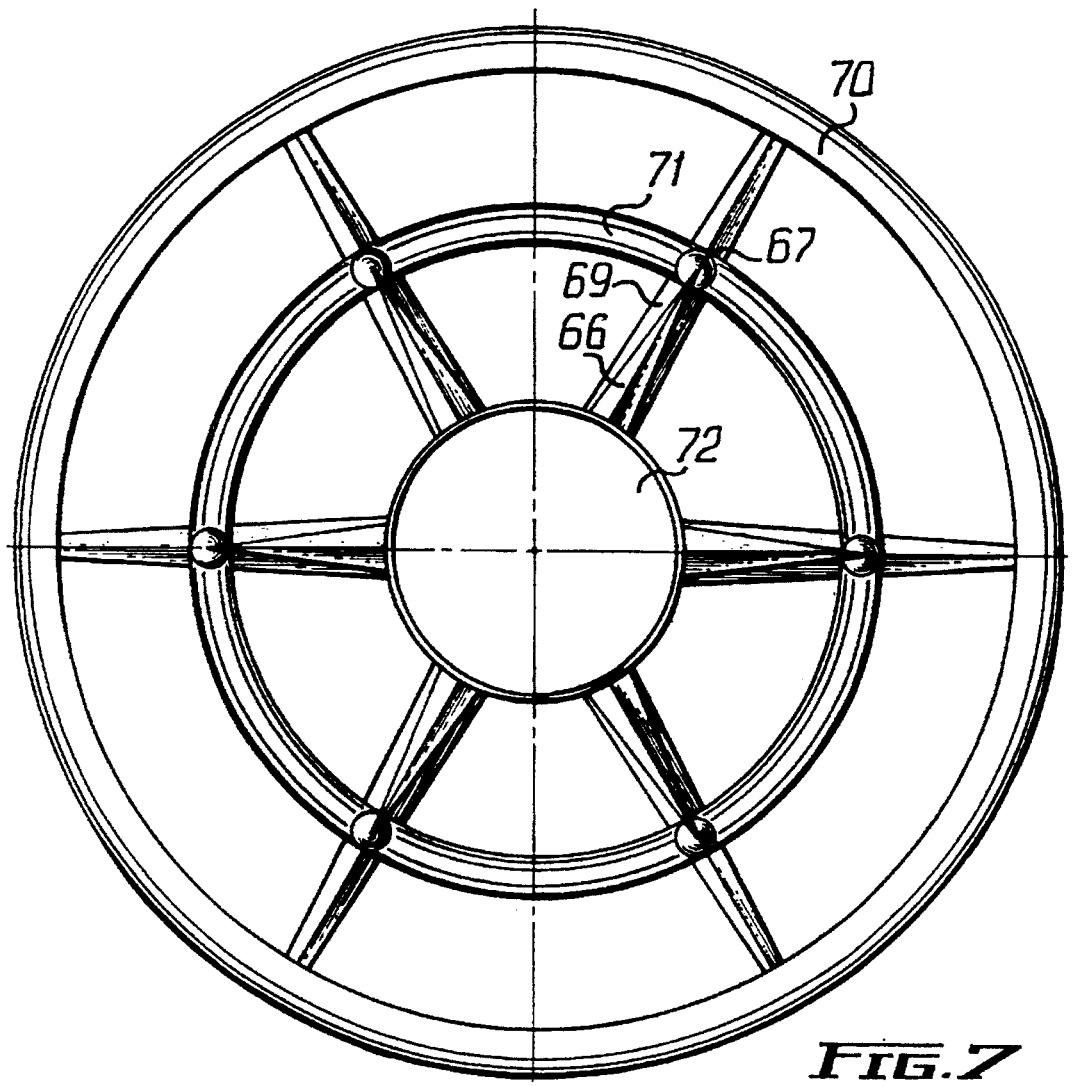
FIG. 7 is a top view of the main frame of FIG. 6.

In FIG. 6, there is shown a cross-sectional vertical view of the main frame 4 of an aircraft constructed according to the teachings of the invention. There are radially extended support arms 66 having hubs 67 for incorporating the bearings 26 and 28 of FIGS. 1 and 3 and the upper bearing 68 of the speed-synchronizing gear 18. There are hubs 68 incorporated into lower radially extended supporting arms 69. These hubs serve as housings for the bearings 25 and 27 and the power transmission 8, of FIG. 1, or for the hydraulic (or electric) transmission motor 38 of FIG. 3. These lower supporting arm hubs 68 of the main frame 4 also provide pivoting points for the vanes 39 and 47 of FIG. 3. To further add to the structural rigidity of the main frame 4, the lower radial supporting arms 69 are connected by a semi-toroidal rim 70. The rim also serves as a protective cover for the outer lifting rotor rim 52 and the power transmission components 50 and 51 of FIG. 4. The rim also serves as well as a housing for stator windings of a linear induction motor drive, when magnetic drive is chosen for use in this invention. A top view of the main frame 4 is shown on FIG. 7. FIG. 7 outlines an important structural element of the main frame, otherwise hidden, a cover 71. A semi-toroidal cover 71 connects the hubs 67 to its rigid ring and simultaneously covers the gap between the counter-rotating rotors 5 and 6 of FIGS. 1, 3, and 4 against unwanted elements. A void cylindrical space 72 of the main frame 4 is a perfect location at the center of gravity for housing a power plant, a payload compartment and a pilothouse as shown on FIGS. 1 and 2. This cylindrical space and associated equipment provides for an exceptional stability unattainable by conventional aircraft. This void space 72 is easy to load and to drop off in emergency along with the above-mentioned parachutable modules comprising a power plant and the non-essentials.

Figure 8:
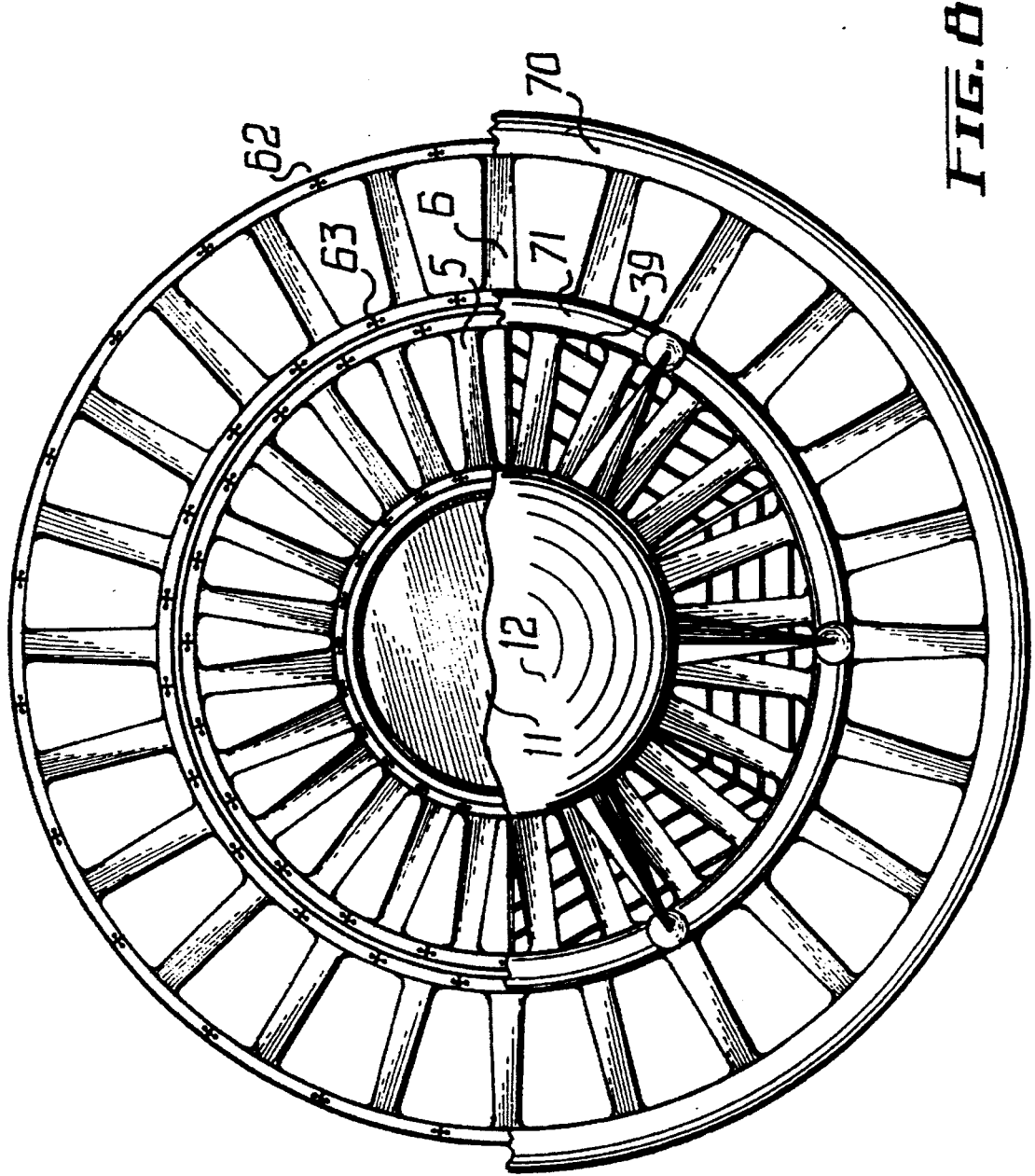
FIG. 8 is a top view of a typical aircraft constructed according to this invention, using the main frame of FIGS. 6 and 7 with a fragmentary exposure of the two counter-rotating lifting rotors.
Figure 9:
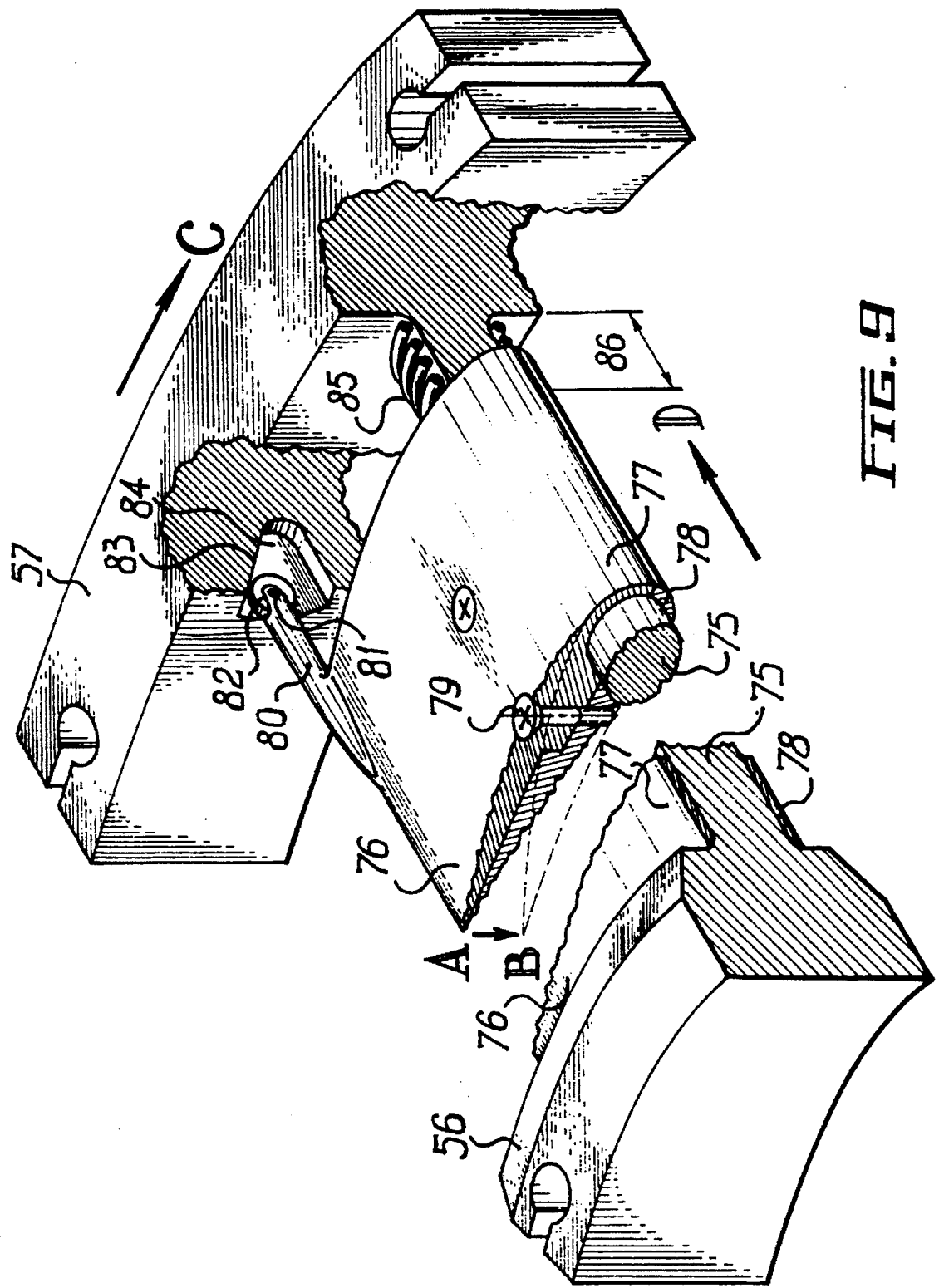
FIG. 9 is a fragmentary perspective cut-away view of the self-adjusting pitch mechanism for an aerofoil blade element with a variable angle of attack for lifting rotors of an aircraft constructed according to the teachings of this invention; and, FIG. 10 is a vertical cross-sectional view of an ultra-light model of an aircraft constructed according to the teachings of this invention and illustrating a simple mechanical transmission and friction drive for two counter-rotating lifting rotors.

With reference to FIG. 8, it is seen that FIG. 8 is a top view of an aircraft constructed according to the invention. There is a fragmentary exposure of the two counter-rotating lifting rotors 5 and 6 of FIGS. 1, 3, 4 and the bonds 62 and 63 of FIG. 5, between individual aerofoil blade elements 55. The payload compartment 11 is covered with a dome-like cover 12. The compartment 11 is shown empty in order to avoid any scale-related comparison while emphasizing the similarity of appearance regardless of the size of aircraft constructed according to the invention. Looking down on this embodiment of an aircraft, one can see the horizontal flight maneuvering vanes 39 of FIG. 3 arranged into 6 sectors of 60 degrees each covering the entire 360 degree circle around the central payload housing of the aircraft. Looking at this embodiment of the invention, it becomes apparent that with all the structural rigidity of the main frame 4, the counter-rotating lifting rotors 5 and 6, are sufficiently exposed to the airflow for a maximum aerodynamic efficiency. This is so regardless of the size of an aircraft and the number of the counter-rotating lifting rotors. A further development of the aerofoil blade element 55 of FIG. 5 is shown on FIG. 9. The element 55 has a self-adjustable pitch from zero to maximum pitch. There is illustrated as Position A of the trailing edge of a blade 76. Position A, in solid line, corresponds to zero pitch. Position B, in broken line, corresponds to the maximum pitch. The aerofoil blade 76 can automatically turn from zero pitch to maximum pitch, from A to B of its trailing edge position in the following manner. The aerofoil blade 76 is assembled of two halves: top 77 and bottom 78 by means of screws 79. The aerofoil blade 76 has a sufficient clearance around a connecting rod 75 to slide between the hubs 56 and 57. This makes it possible to either open a gap 86, maintained (when a lifting rotor, comprised of a plurality of these aerofoil blade elements, is not rotating) by a spring 85. Or, to close the gap under the pressure of centrifugal force, acting upon the aerofoil blade 76 in the direction D when the lifting rotor turning in the direction C reaches a certain speed of rotation. The movement of the aerofoil blade 76 around the connecting rod 75 is limited to only two position of its trailing edge A and B by a control rod 80 integrated with the aerofoil blade 76. The control rod 80 on its free end has a shaft 81 or pin 81 and on which rotates a roller 82. This roller 82 and the rod 80 position the aerofoil blade 76.

In a hovering position the lifting rotor comprised of these self-adjustable aerofoil blade elements, the spring 85 is pushing the aerofoil blade 76 to its start-up position close to the hub 56, while simultaneously overcoming the weight of the aerofoil blade and keeping it in Position A. In Position A trailing edge of aerofoil blade 76 corresponds to Zero Pitch. Upon starting the rotation of the blades 76 the pitch is Zero Pitch of the blade 76 is in Position A, solid line. As the lifting rotor 5 and 6 reaches a certain speed of rotation, the weight of the aerofoil blade 76, increased by centrifugal force, will overcome the resistance of the spring 85 and begin to close the gap 86 and move toward the hub 57. In the process the control rod 80 with roller 82 will move along a guiding path 83 of a control slot 84. This secures the trailing edge of the aerofoil blade 76 in the Position B, in broken line, corresponding to a Maximum Pitch. The aerofoil blade 76 remains in Position B as long as the rotating speed of the lifting rotor 5 or 6 remains the same or higher. After an aircraft has landed and its lifting rotors 5 or 6 begin to slow their rotation, disengaged from the power source, the G-forces acting upon the aerofoil blade 76 decrease to the point where the spring 85 can return the blade 76 to the initial Zero Pitch Position A. The lifting rotors 5 or 6 of an aircraft constructed according to the invention may have only the fixed-pitch aerofoil blade elements; only the self-adjustable ones; or a combination of both. Both types in their preferred embodiment are interchangeable. The last of the preferred embodiments of the present invention is shown on FIG. 10 in a form of ultra-light aircraft 100 constructed in accordance with the invention. To emphasize the similarity between the different embodiments of the invention already discussed, the same reference numerals are being used as long as the difference between embodiments is minor and superficial. The aircraft 100 is substantially disc-shaped and symmetrical about its vertical axis 3, having a main frame 4 with a hollow cylindrical space 72 along its vertical axis extending downward into a compartment 91 serving as a housing for a prime mover 7, a fuel tank 9 and a pilot with manual controls 99. The pilot and the controls are covered from the weather with a dome-like transparent cover 12 securely fastened to the cylindrical top of the main frame 4. A plurality of support arms 66 radially extend from the main frame to bearing hubs 67. Similarly, in a mirror reflection fashion relative to the upper supporting arms 66, there are lower supporting arms 66 and 69 radially extending to respective bearing hubs 68. The number of the supporting arms 66 and 69 with bearing hubs will vary from one embodiment to another embodiment of the invention but cannot be fewer than shown on FIG. 10. That is two upper and two lower supporting arms with respective bearing hubs at their ends.

Figure 10:
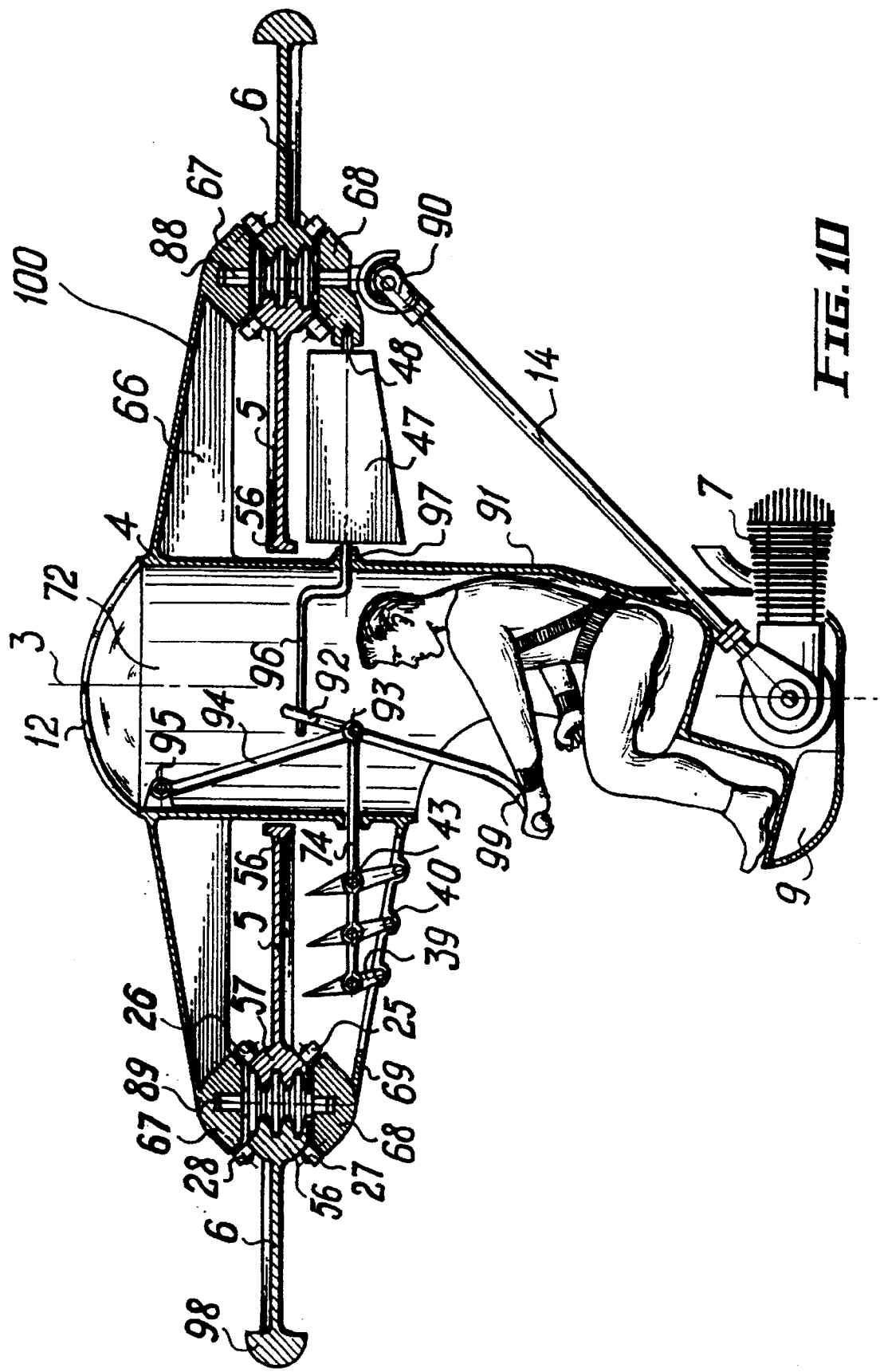

Unlike the embodiment of aircraft 2 of FIG. 1 which two lifting rotors 5 and 6 are driven by means of a toothed gear 18. The gear is in the gap between the toothed rims 19 and 20 of said counter-rotating lifting rotors 5 and 6. The ultra-light aircraft 100 has its lifting rotors 5 and 6 driven by a friction wheel and shaft 88. The shaft 88 extends downwardly and keys into a universal joint 90. The shaft 88 receives its power and torque from universal joint 90 which operatively connects with shaft 14. The shaft 14 is driven by an engine 7 serving as a prime mover. The friction wheel and shaft combination 88 represents a cylinder with tapered ribs and grooves. These ribs and grooves intermesh with similar ribs and grooves of the inner rim 56 of the outer lifting rotor 6 and with similar ribs and grooves of the outer rim 57 of the inner lifting rotor 5. These tapered ribs and grooves, similar to the well-known v-belt drive transmission, are not the only means to multiply friction between surfaces of limited area. These tapered ribs and grooves are well-known in the art and, therefore, are not detailed here. Further, the means to multiply friction may widely differ from one embodiment of the invention to another embodiment. There is a substantial difference between the above-mentioned preferred embodiments 2 and 100 of an aircraft constructed according to the invention and the suspension means for their counter-rotating lifting rotors. Namely, the inner rim 56 of the inner lifting rotor 5, and the outer rim 98 of the outer lifting rotor 6 are not restricted in their deflection by bearings in either upwardly or downwardly movement. An ultra-light size of aircraft constructed according to the invention will have enough stiffness in the lifting rotors 5 and 6 to render such bearings unnecessary. With respect to FIG. 3 bearings 25, 26, 27 and 28, fitted to the bearing hubs 67 and 68, keep the rims 56 and 57 of respective lifting rotors 5 and 6 in an intermeshing relationship. In FIG. 10, the driving friction wheel and shaft 88 with the idler (speed-synchronizing) friction wheel 89, simultaneously serve as thrust bearings and bearings 25, 26, 27 and 28 as a means to maintain a constant pressure on the friction surfaces. For further reducing an overall weight of the aircraft 100, its main frame's lower supporting arms 69 end up at the bearing hubs 68, rather than extending further out to the semi-toroidal cover 29 of the FIG. 1 embodiment. The ultra-light embodiment 100, for simplicity, is equipped with only one system of vanes 39 for horizontal ahead or reverse movements. If a pilot desires to make a 90 degree turn, he would have to use a turning vane 47 to face the new direction. The vanes 39 would be aligned with the new course of travel.

These maneuvers are easily executed by manual control means consisting of levers, control rods and pivoting pins. With respect to FIG. 10 and shown in flight the preferred embodiment 100 of an ultra-light aircraft is in a forward horizontal flight corresponding to a forward position of a control stick 99 pushed forward by the pilot. This movement of the control stick 99 is conveyed to the vanes 39 by a control rod 74. The vanes 39 are pivoted through pins 43 to the control rod 74. The vanes 39 have freedom of turning around pivoting pins 40 which are secured in the lower supporting arm 69 of the main frame 4. The thrust of the airstream from the lifting rotor 5 upon the vanes 39 may bring the desired horizontal movement effect to the aircraft 100. The control stick 99 controls the horizontal propulsion and maneuvering vanes 39 when moved ahead or in reverse around its pivoting point 95 and extension 94. The control stick can also turn around a ball-joint 93 to move a crank 96 to the right or to the left of the center line of the turning vane 47. The vane is pivoted at points 48 and 97 of the main frame 4 of the aircraft 100. There is fork connection 92 between the control stick 99 and the crank 96 of the turning vane 47. The pilot is able to control with a single hand the horizontal flight and maneuvering of aircraft 100. With the other hand the pilot can control the vertical flight by increasing or decreasing the output revolutions of the prime mover 7 or engine 7 by throttling its fuel supply.

Figure 11:
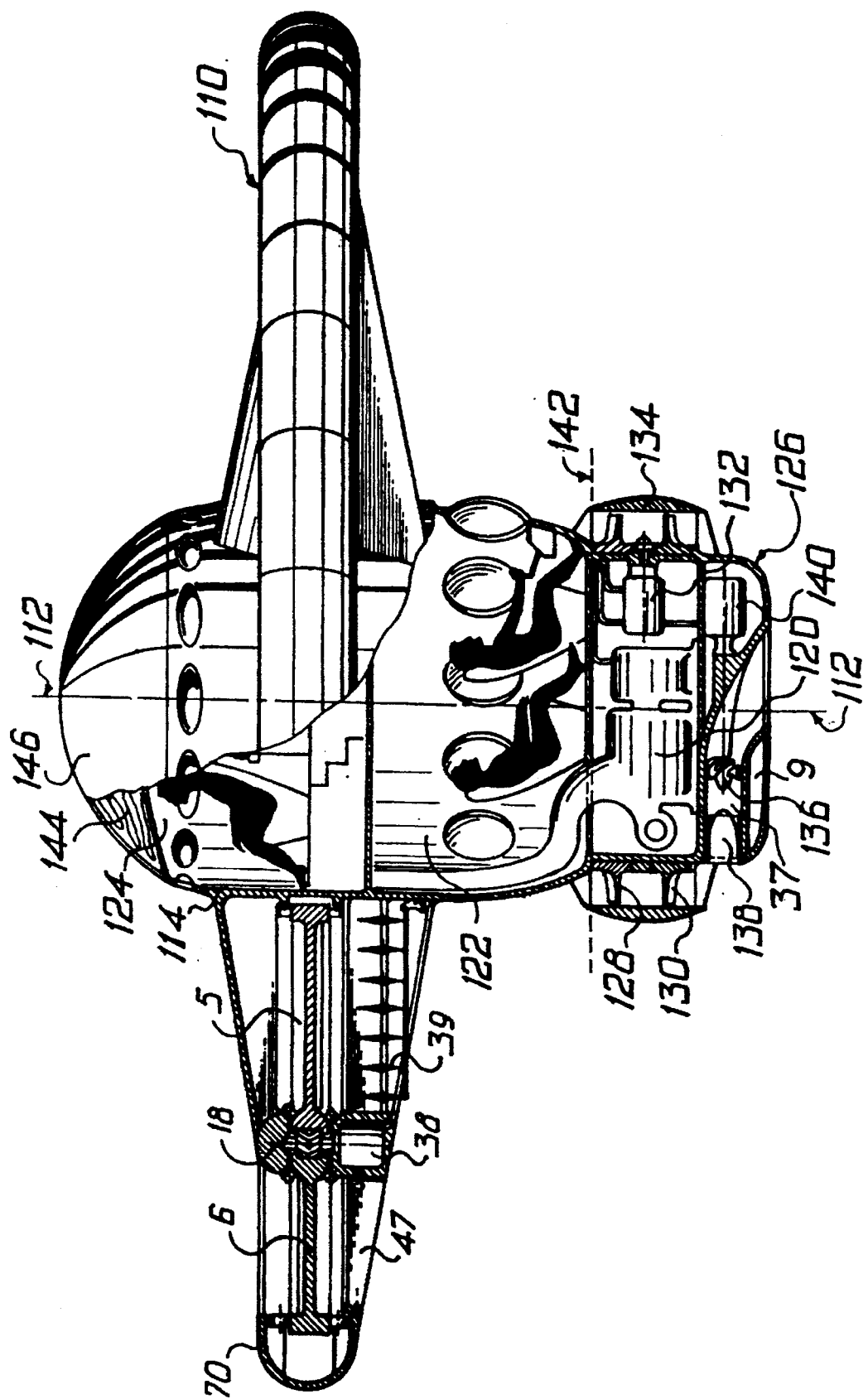
FIG. 11 is a fragmentary vertical cross-sectional view of an aircraft embodying this invention with a marine propulsion capability for underwater travel and maneuvering; and, FIG. 12 is a fragmentary vertical cross-sectional view of a detachable (for emergency surfacing or landing) marine propulsion/power plant/retractable landing gear module.

With reference to the drawings, wherein like reference characters designate identical or corresponding parts, and more particularly to FIG. 11 the reference numeral 110 indicates one form of a heavier-than-air aircraft embodying this invention. The aircraft 110, a disk-shaped structure, is substantially symmetrical about a vertical axis 112. The aircraft 110 comprises a main frame 114 for radially extending its integral structural members to carry the load and the thrust from two counter-rotating lifting rotors 5 and 6. Power is provided by a prime mover 120. The prime mover 120 generates either electric or hydraulic power and which power is transmitted to a driving motor 38. The motor 38 drives the lifting rotors 5 and 6 by means of a speed-synchronizing gear 18. The gear 18 intermeshes, simultaneously, with both rotors 5 and 6. A three-dimensional maneuverability in the air is provided by the use of said counter-rotating lifting rotors 5 and 6, vanes 39, and vanes 47. Vanes 39 provide for horizontal thrust in a chosen direction of flight, forwardly or in reverse. Vanes 47 make it possible to rotate the aircraft 110 around its axis 112. This allows the pilot to face a new flight direction, or in hovering posture, to have a full panoramic view of the area below. This embodiment of the present invention is provided with two passengers and a crew, or two payload compartments: 122 and 124. 122 and 124 are located one above another inside the central cylindrical-in-shape section of the main frame 114.

The heaviest part of the aircraft, which provides for a lower center of gravity and also contributes for an exceptional stability of this craft, is the marine propulsion module 126. This module is a multi-functional housing for the prime mover 120, fuel tankage 9, counter-rotating diving rotors 128 and 130, and their drive motor 132. The diving rotors 128 and 130 are provided with a shroud 134. The shroud 134 provides for better thrust efficiency and protection. Horizontal thrust for sub-surface travel or submersible travel in water is provided by a marine propeller 136 located also for a better efficiency and protection, in a nozzle-like tunnel. An inside rudder 138 provides for a change of course, or a 360 degree spin, whether the aircraft is fully submerged or partially submerged in water. The marine propeller 136 is powered by a motor 140, either electric or hydraulic. The motor 140 is operatively connected, like the motors 38 and 132, to the prime mover 120. The prime mover 120 also provides power for the landing gear's deployment for landing and withdrawal when it is not needed.

The marine propulsion module 126 can be detached along a separation joint line 142 from the main frame 114. This may be advantageous in an emergency. The module 126 is the heaviest part of the aircraft 110 and is detachable from the main part of the aircraft 110. The module 126 can be sent parachuting down while the aircraft 110 is in an emergency situation. The aircraft 110 may have inflated its balloon/parachute combination 144, stored normally under a hood 146, to ensure a soft landing. Similarly, when the aircraft is in trouble while submersed in water the detachability of the module 126, together with the inflating of the rescue balloon 144, would be a very useful safety net. Among other safety features of the aircraft 110 of FIG. 11 is a semi-toroidal rim 70 of the main frame 114. The rim 70 provides bumper-protection for the lifting rotor 6 while carrying its upward thrust. This "bumper" rim 70 allows this type of aircraft to fly in a tight "bumper-to-bumper" formation. The rim 70 also makes it possible to "dock" the aircraft while hovering in a rescue mission alongside a ship in trouble or wall of a burning sky-scraper or a high cliff.

Figure 12:
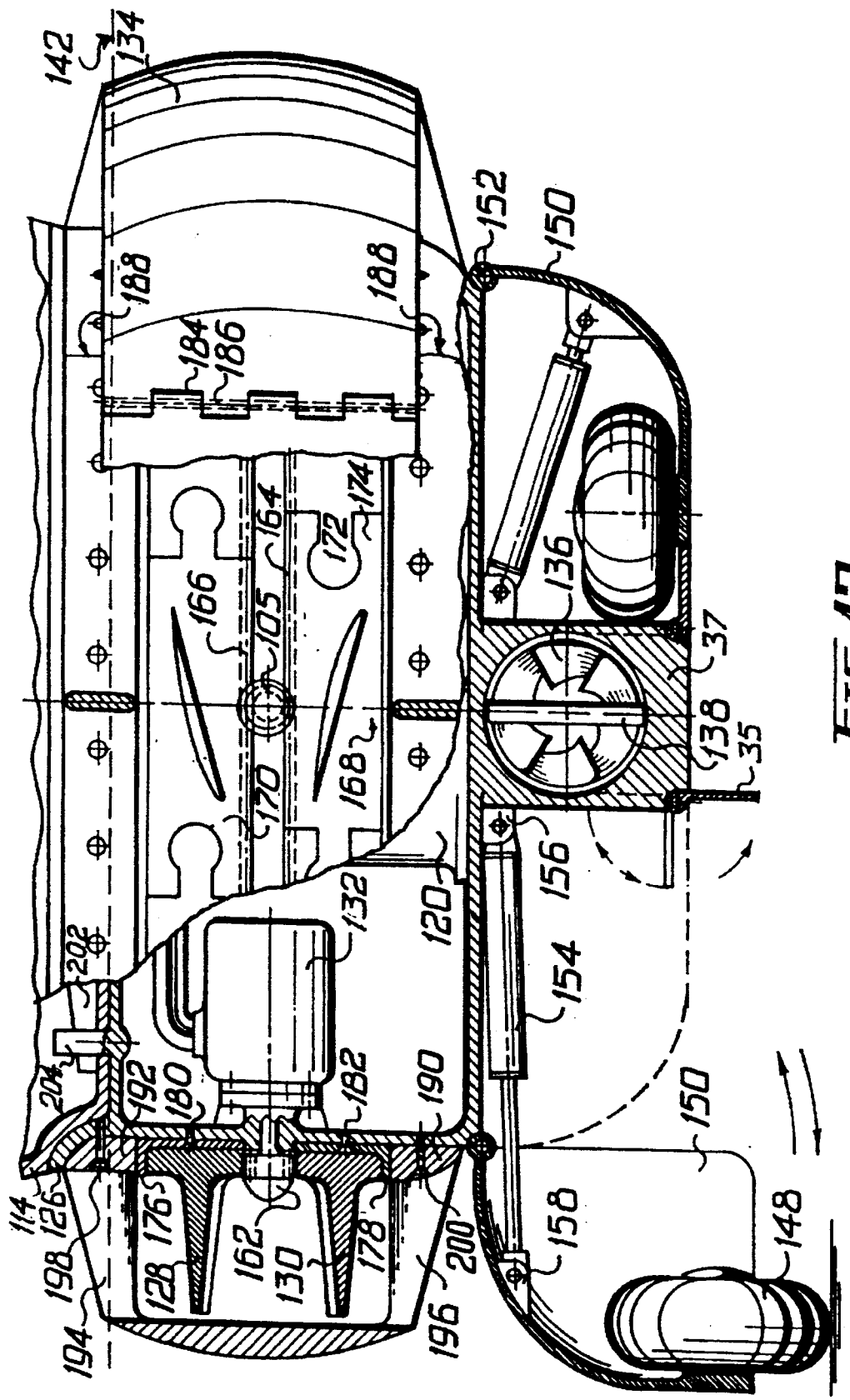

FIG. 12 illustrates the marine propulsion module 126 which is also the engine room of this aircraft and where the prime mover 120 is housed along with a landing gear. There are two major equally important reasons for making this module detachable. A first reason is for emergency landing or surfacing. Another reason is to make the "main frame" aircraft more versatile. The main frame is adaptable to a variety of modules equipped with different types of prime movers; different landing gear; or, a jet-propulsion to improve the speed of horizontal flight, etc. By having the heaviest part of the aircraft 110 detachable there is an increased possibility of survivability in the air and also greater buoyancy underwater.

With reference to FIG. 12 it is seen that the marine propulsion module 126 allows this aircraft to land on land; to taxi from land into the water; or to roll up the landing ramp from the water onto land. This is achieved by a simple and reliable set of four spaced-apart wheels 148. The wheels 148 can be "free-rolling", or electrically/hydraulically driven from their hubs. Each couple of wheels, spaced apart to ensure the needed balance, is attached to its hood 150. The hood 150 is pivoted to the lower part of the module with a hinge 152. Deployment of this landing gear from stored position and back to operational position is achieved by hydraulic (or other types) of jacks 154. The jacks are pivoted at connecting points 156 and 158. Complete enclosure of the landing gear inside the lower part of the marine propulsion module is assured by a simple flap-cover 35 which can be opened or closed by the wheels 148. The marine propeller 136, and the rudder 138, are hidden in the nozzle 37 for better efficiency, protection, and aerodynamic compatibility with the rest of the aircraft 110.

The submersibility of this aircraft in water is achieved by the diving rotors 128 and 130. These rotors are provided to overcome the remaining buoyancy of the aircraft once the aircraft 110 has "landed" on water and has become semi-submerged. This point may be argued by a modern aircraft engineer trained to design aircraft as light as technologically possible. This is because the fixed wing concept is not mechanically efficient. The only way to increase the efficiency of a conventional aeroplane is to minimize its weight. This "rule of thumb" of minimum weight of conventional aircraft engineering is only partially true to the rotary aircraft whose full potential has not been fully explored. This is an important point on which the present invention rests.

An aircraft constructed according to the teachings of this invention does not have the limitations of the helicopter concept and the Archimedean screw concept. This is realized by virtue of its high mechanical efficiency as power is applied to the outside rim of the lifting rotors. Further, the diameter of the lifting rotor, a major factor of the lifting capacity, has no limitations of the helicopter concept. As a result this aircraft can lift heavier loads per unit of power than conventional fixed wing aircraft. The aircraft 2 can initially be heavier than conventional aircraft.

Submerging of the aircraft 110 in water is achieved (with or without the flooding of the conventional ballast tanks) by directing the entire prime mover's power output for driving the counter-rotating diving rotors 128 and 130 downward. Depending on the underwater maneuvering being exercised, this power output is then balanced between the vertical thrust and horizontal thrust requirements. The horizontal underwater thrust is provided by rather conventional propeller 136. However, vertical underwater thrust is provided by reversing the diving rotors 128 and 130.

Counter-rotating propellers were first used in torpedo designs to prevent a torpedo from spinning. Otherwise, it would be necessary to use large fin-stabilizers in a torpedo with all the unwanted side-effects. The counter-rotating diving rotors 128 and 130 provide vertical up or down thrust while balancing each others residual torque. There is the motor (electric or hydraulic) 132, which drives the diving rotors 128 and 130 at equal speed and in the opposite direction by means of a gear wheel 162. The gear wheel 162 meshes with the toothed rim 164 of the lower diving rotor 130 and the toothed rim 166 of the upper diving rotor 128. Said rotors are assembled in a simple chain-link fashion out of hydrofoil elements 168 and 170 by means of "dove-tail" locks or bonds 172 and 174 of the elements to be linked. A similar construction is illustrated in FIG. 5 with inner rim 58, and bonding recesses 65. Bond 63 is in bonding recesses 65. Similarly, there is an outer rim 59 having bonding recesses 64. Bond 62 is in bonding recesses 64. These locks 62 or bonds are secured by tack welding which is accepted in marine engineering practice. The rotors 128 and 130 slide around the cylindrical body of the marine propulsion module 126, along the upper bearing track 176, and lower bearing track 178, respectively. These bearing tracks are made of materials widely used and readily accepted in marine engineering for water-lubricated bearings. They are assembled out of dove-tailed to each other sections and are securely fastened to said module 126 cylindrical sidewall by conventional screws 180 and 182, respectively. The uniformly even gap between the toothed rims 164 and 166 of the upper and lower diving rotors 128 and 130, is maintained by several spaced-apart gear wheels 162. Some gear wheels are driving gear wheels (coupled with motors 132) and others are idling gear wheels. The idling gear wheels 162 carry out the important function (like in case of counter-rotating lifting rotors 5 and 6, of FIG. 1) of speed synchronizing the rotational speed of the diving rotors 128 and 130. The shroud 134 is assembled from several sections. The sections are joined at 184 by pins 186 on the outside, and along the split 188 of the lower inner rim 190 and the upper inner rim 192. Struts 194 and 196, provide a solid structural connection between the outside shroud 134, and its inner rims which are bolted to said module by conventional fasteners 198 and 200. The direction of the thrust (either upward or downward, diving or surfacing) is determined by the pilot at the controls by changing the direction of rotation of the motor 132. Locking pins 202, operated mechanically, electrically or hydraulically by the pilot in control of the aircraft, provide a secure attachment of the marine propulsion (and others) module to the main frame 114, when inserted into locks 204, belonging to said module(s). The number and type of the locking devices can vary from one size/type of the aircraft constructed according to this invention, to another. The locking devices are selected to be compatible with the size of the aircraft.

The self-adjusting blade is not restricted to this invention and rotor having a circular or continuous inner rim, a circular or continuous outer rim. The self-adjusting blade can be used with a rotor having an inner rim and a discontinuous outer rim. Such an application would be on a helicopter having a plurality of blades connected to a hub or shaft which could be continuous. There could be an outer rim for each blade making the outer rim discontinuous.

An aircraft having a three-dimensional freedom of movement and comprising a frame; a first rotating lifting rotor; a second rotating lifting rotor; said first rotor and said second rotor rotate in opposite directions; a prime mover operatively connecting with said frame; a first means operatively connecting together said prime mover and said first rotor for rotating said first rotor; a second means operatively connecting together said prime mover and said second rotor for rotating said second rotor; and, a control means for controlling the speed of rotation of said first rotor and said second rotor.

An aircraft having a three-dimensional freedom of movement and comprising a frame; a first rotating lifting rotor; a second rotating lifting rotor; said first rotor and said second rotor rotate in opposite directions; a prime mover operatively connecting with said frame; a first means operatively connecting together said prime mover and said first rotor for rotating said first rotor; a second means operatively connecting together said prime mover and said second rotor for rotating said second rotor; a control means for controlling the speed of rotation of said first rotor and said second rotor; moveable vanes operatively connecting with said frame and positioned to receive the flow of fluid from a rotor to assist in moving the aircraft in a substantially horizontal direction; and, a turning vane operatively connecting with said frame and positioned to receive the flow of fluid from a rotor to assist in moving the aircraft around a substantially vertical axis.

An aircraft having a three-dimensional freedom of movement and comprising a frame; a first rotating lifting rotor; a second rotating lifting rotor; said first rotor and said second rotor rotate in opposite directions; a prime mover operatively connecting with said frame; a first means operatively connecting together said prime mover and said first rotor for rotating said first rotor; a second means operatively connecting together said prime mover and said second rotor for rotating said second rotor; a control means for controlling the speed of rotation of said first rotor and said second rotor; moveable vanes operatively connecting with said frame and positioned to receive the flow of fluid from a rotor to assist in moving the aircraft in a substantially horizontal direction; a turning vane operatively connecting with said frame and positioned to receive the flow of fluid from a rotor to assist in moving the aircraft around a substantially vertical axis; said first rotor having a toroidal configuration having a first circular inner rim, a second circular outer rime, and a first aerofoil blade operatively connecting with said first inner rim and said second outer rim; said second rotor having a toroidal configuration having a third circular inner rim and a fourth circular outer rim and a second aerofoil blade operatively connecting with said third inner rim and said fourth outer rim; and, said fourth outer rim being of a smaller dimension than the dimension of said first inner rim.

An aircraft having a three-dimensional freedom of movement and comprising a frame; a first rotating lifting rotor; a second rotating lifting rotor; said first rotor and said second rotor rotate in opposite directions; a prime mover operatively connecting with said frame; a first means operatively connecting together said prime mover and said first rotor for rotating said first rotor; a second means operatively connecting together said prime mover and said second rotor for rotating said second rotor; a control means for controlling the speed of rotation of said first rotor and said second rotor; a third rotating diving rotor; a fourth rotating diving rotor;

said third diving rotor and said fourth diving rotor rotating in opposite directions; a control means for controlling the speed of rotation of said third rotor and said fourth rotor; a means operatively connecting together said prime mover and said third rotor and said fourth rotor for rotating said third rotor and said fourth rotor; a marine propeller for propelling said aircraft in water; a rudder for directing the course of movement of said aircraft in water; a marine module; an attaching means for attaching said marine module to said frame; said attaching means being capable of releasing said marine module from said frame; said marine module housing and operatively connecting with said third rotor and said fourth rotor, said marine propeller and said rudder; in said marine module there being a nozzle-like tunnel; said marine propeller being in said tunnel; said marine module being attached to the lower part of said frame; and, a turning vane operatively connecting with said frame and positioned to receive the flow of fluid from a lifting rotor to assist in moving the aircraft around a substantially vertical axis.

An aircraft having a three-dimensional freedom of movement and comprising a frame; a first rotating lifting rotor; a second rotating lifting rotor; said first rotor and said second rotor rotate in opposite directions; a prime mover operatively connecting with said frame; a first means operatively connecting together said prime mover and said first rotor for rotating said first rotor; a second means operatively connecting together said prime mover and said second rotor for rotating said second rotor; a control means for controlling the speed of rotation of said first rotor and said second rotor; said first rotor having a toroidal configuration having a first circular inner rim, a second circular outer rime, and a first aerofoil blade operatively connecting with said first inner rim and said second outer rim; said second rotor having a toroidal configuration having a third circular inner rim and a fourth circular outer rim and a second aerofoil blade operatively connecting with said third inner rim and said fourth outer rim; said fourth outer rim being of a smaller dimension than the dimension of said first inner rim; said second rotor being positioned inside of said first rotor; said second rotor and said first rotor being coplanar and rotating around the same vertical axis; a first region for housing an operator to control the operation of said aircraft; and, a second region for receiving and housing a payload.

A process for making an aircraft having a three-dimensional freedom of movement, said process comprising forming a frame; folding and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; operatively connecting and positioning moveable vanes with said frame for receiving the flow of fluid from a rotor to assist in moving the aircraft in a substantially horizontal direction; operatively connecting and positioning a turning vane with said frame for receiving the flow of fluid from a rotor to assist in moving the aircraft around a substantially vertical axis; forming said first rotor to have a toroidal configuration to have a first circular inner rim and a second circular outer rim and a first aerofoil blade operatively connecting with said first inner rim and said second outer rim; forming said second rotor to have a toroidal configuration to have a third circular inner rim and a fourth circular outer rim and a second aerofoil blade operatively connecting with said third inner rim and said fourth outer rim; and, forming said fourth outer rim to be of a smaller dimension than the dimension of said first inner rim.

A process for making an aircraft having a three-dimensional freedom of movement, said process comprising forming a frame; forming and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; forming and operatively connecting a third rotating diving rotor with said frame; forming and operatively connecting a fourth rotating diving rotor with said frame; rotating said third diving rotor and said fourth diving rotor in opposite directions; controlling the speed of rotation of said third rotor and said fourth rotor; operatively connecting together said prime mover and said third rotor and said fourth rotor for rotating said third rotor and said fourth rotor; operatively connecting a marine propeller with said prime mover for propelling said aircraft in water; incorporating a rudder in said aircraft for directing the course of movement of said aircraft in water; forming a marine module; attaching said marine module to said frame; attaching said marine module in such a manner that the marine module can be released from said frame; housing in said marine module and operatively connecting with said third rotor and said fourth rotor, said marine propeller and said rudder; forming said marine module with a nozzle-like tunnel; positioning said marine propeller in said tunnel; and, attaching said marine module to the lower part of said frame.

A process for making an aircraft having a three-dimensional freedom of movement, said process comprising forming a frame; forming and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; forming and operatively connecting a third rotating diving rotor with said frame; forming and operatively connecting a fourth rotating diving rotor with said frame; rotating said third diving rotor and said fourth diving rotor in opposite directions; controlling the speed of rotation of said third rotor and said fourth rotor; operatively connecting together said prime mover and said third rotor and said fourth rotor for rotating said third rotor and said fourth rotor; and, operatively connecting a turning vane with said frame and positioning said turning vane to receive the flow of fluid from a lifting rotor to assist in moving the aircraft around a substantially vertical axis.

An aircraft having a three-dimensional freedom of movement and made by a process comprising forming a frame; forming and operatively connecting a first rotating lifting rotor with said frame; forming and operatively connecting a second rotating lifting rotor with said frame; rotating said first rotor and said second rotor in opposite directions;

operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; operatively connecting and positioning moveable vanes with said frame for receiving the flow of fluid from a rotor to assist in moving the aircraft in a substantially horizontal direction; operatively connecting and positioning a turning vane with said frame for receiving the flow of fluid from a rotor to assist in moving the aircraft around a substantially vertical axis; forming said first rotor to have a toroidal configuration to have a first circular inner rim and a second circular outer rim and a first aerofoil blade operatively connecting with said first inner rim and said second outer rim; forming said second rotor to have a toroidal configuration to have a third circular inner rim and a fourth circular outer rim and a second aerofoil blade operatively connecting with said third inner rim and said fourth outer rim; and, forming said fourth outer rim to be of a smaller dimension than the dimension of said first inner rim.

An aircraft having a three-dimensional freedom of movement and made by a process comprising forming a frame; forming and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; forming and operatively connecting a third rotating diving rotor with said frame; forming and operatively connecting a fourth rotating diving rotor with said frame; rotating said third diving rotor and said fourth diving rotor in opposite directions; controlling the speed of rotation of said third rotor and said fourth rotor; and, operatively connecting together said prime mover and said third rotor and said fourth rotor for rotating said third rotor and said fourth rotor.

An aircraft having a three-dimensional freedom of movement and made by a process comprising forming a frame; forming and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; operatively connecting a marine propeller with said prime mover for propelling said aircraft in water; incorporating a rudder in said aircraft for directing the course of movement of said aircraft in water; forming a marine module; attaching said marine module to said frame; attaching said marine module in such a manner that the marine module can be released from said frame; housing in said marine module and operatively connecting with said third rotor and said fourth rotor, said marine propeller and said rudder; forming said marine module with a nozzle-like tunnel; positioning said marine propeller in said tunnel; and, attaching said marine module to the lower part of said frame.

An aircraft having a three-dimensional freedom of movement and made by a process comprising forming a frame; forming and operatively connecting a first rotating lifting rotor with said frame; forming and operatively connecting a second rotating lifting rotor with said frame; rotating said first rotor and said second rotor in opposite directions; operatively connecting a prime mover to said frame; operatively connecting together said prime mover and said first rotor for rotating said first rotor; operatively connecting together said prime mover and said second rotor for rotating said second rotor; controlling the speed of rotation of said first rotor and said second rotor; and, operatively connecting a turning vane with said frame and positioning said turning vane to receive the flow of fluid from a lifting rotor to assist in moving the aircraft around a substantially vertical axis.

What I claim is:

1. A submersible aircraft having a three-dimensional freedom of movement in the air and in the water and comprising:
   a. a frame;
   b. a first rotating lifting rotor;
   c. a second rotating lifting rotor;
   d. said first rotor and said second rotor rotate in opposite directions;
   e. a prime mover operatively connecting with said frame;
   f. a first means operatively connecting together said prime mover and said first rotor for rotating said first rotor;
   g. a second means operatively connecting together said prime mover and said second rotor for rotating said second rotor;
   h. a control means for controlling the speed of rotation of said first rotor and said second rotor;
   i. said first rotating lifting rotor having an inner diameter;
   j. said second rotating lifting rotor having an outer diameter; and
   k. said outer diameter being smaller than said inner diameter so as to allow said second rotating lifting rotor to be positioned inside of said first rotating lifting rotor.

2. An aircraft according to claim 1 and comprising:
   a. moveable vanes operatively connecting with said frame and positioned to receive the flow of fluid from a rotor to assist in moving the aircraft in a substantially horizontal direction; and,
   b. a turning vane operatively connecting with said frame and positioned to receive the flow of fluid from a rotor to assist in moving the aircraft around a substantially vertical axis.

3. An aircraft according to claim 1 and comprising:
   a. said first rotor having a disc configuration having a first circular inner rim, a second circular outer rim, and a plurality of aerofoil blades operatively connecting with said first inner rim and said second outer rim;
   b. said second rotor having a disc configuration having a third circular inner rim and a fourth circular outer rim and a plurality of aerofoil blades operatively connecting with said third inner rim and said fourth outer rim; and,
   c. said fourth outer rim being of a smaller dimension than the dimension of said first inner rim.

4. An aircraft according to claim 1 and comprising:
   a. a third rotating diving rotor;
   b. a fourth rotating diving rotor;
   c. said third diving rotor and said fourth diving rotor rotating in opposite directions;
   d. a control means for controlling the speed of rotation of said third rotor and said fourth rotor; and e. a means operatively connecting together said prime mover and said third rotor and said fourth rotor for rotating said third rotor and for rotating said fourth rotor.

5. An aircraft according to claim 4 and comprising:
   a. a marine propeller for propelling said aircraft in water;
   b. a rudder for directing the course of movement of said aircraft in water;
   c. a marine module;
   d. an attaching means for attaching said marine module to said frame;
   e. said attaching means being capable of releasing said marine module from said frame;
   f. said marine module housing and operatively connecting with said third rotor and said fourth rotor, said marine propeller and said rudder;
   g. in said marine module there being a nozzle-like tunnel;
   h. said marine propeller being in said tunnel; and,
   i. said marine module being attached to the lower part of said frame.

6. An aircraft according to claim 4 and comprising:
   a. a turning vane operatively connecting with said frame and positioned to receive the flow of fluid from a lifting rotor to assist in moving the aircraft around a substantially vertical axis.

7. An aircraft according to claim 3 and comprising:
   a. said second rotor being positioned inside of said first rotor; and,
   b. said second rotor and said first rotor being coplanar and rotating around the same vertical axis.

8. An aircraft according to claim 1 and comprising:
   a. a first region for housing an operator to control the operation of said aircraft; and,
   b. a second region for receiving and housing a payload.

9. A process for making submersible aircraft having a three-dimensional freedom of movement in the air and in the water, said process comprising:
   a. forming a frame;
   b. forming and operatively connecting a first rotating lifting rotor with said frame;
   c. forming and operatively connecting a second rotating lifting rotor with said frame;
   d. rotating said first rotor and said second rotor in opposite directions;
   e. operatively connecting a prime mover to said frame;
   f. operatively connecting together said prime mover and said first rotor for rotating said first rotor;
   g. operatively connecting together said prime mover and said second rotor for rotating said second rotor;
   h. controlling the speed of rotation of said first rotor and said second rotor;
   i. forming said first rotating lifting rotor to have an inner diameter;
   j. forming said second rotating lifting rotor to have an outer diameter; and
   k. forming said outer diameter to be smaller than said inner diameter so as to allow said second rotating lifting rotor to be positioned inside of said first rotating lifting rotor.

10. A process according to claim 9 and comprising:
    a. operatively connecting and positioning moveable vanes with said frame for receiving the flow of fluid from a rotor to assist in moving the aircraft in a substantially horizontal direction; and,
    b. operatively connecting and positioning a turning vane with said frame for receiving the flow of fluid from a rotor to assist in moving the aircraft around a substantially vertical axis.

11. A process according to claim 10 and comprising:
    a. forming said first rotor to have a disc configuration to have a first circular inner rim and a second circular outer rim and a plurality of aerofoil blades operatively connecting with said first inner rim and said second outer rim;
    b. forming said second rotor to have a disc configuration to have a third circular inner rim and a fourth circular outer rim and a plurality of aerofoil blades operatively connecting with said third inner rim and said fourth outer rim; and,
    c. forming said fourth outer rim to be of a smaller dimension than the dimension of said first inner rim.

12. A process according to claim 9 and comprising:
    a. forming and operatively connecting a third rotating diving rotor with said frame;
    b. forming and operatively connecting a fourth rotating diving rotor with said frame;
    c. rotating said third diving rotor and said fourth diving rotor in opposite directions;
    d. controlling the speed of rotation of said third rotor and said fourth rotor; and
    e. operatively connecting together said prime mover and said third rotor and said fourth rotor for rotating said third rotor and for rotating said fourth rotor.

13. A process according to claim 12 and comprising:
    a. operatively connecting a marine propeller with said prime mover for propelling said aircraft in water;
    b. incorporating a rudder in said aircraft for directing the course of movement of said aircraft in water;
    c. forming a marine module;
    d. attaching said marine module to said frame;
    e. attaching said marine module in such a manner that the marine module can be released from said frame;
    f. enclosing said marine module and operatively connecting with said third rotor and said fourth rotor, said marine propeller and said rudder;
    g. forming said marine module with a nozzle-like tunnel;
    h. positioning said marine propeller in said tunnel; and
    i. attaching said marine module to the lower part of said frame.

14. A process according to claim 12 and comprising:
    a. operatively connecting a turning vane with said frame and positioning said turning vane to receive the flow of fluid from a lifting rotor to assist in moving the aircraft around a substantially vertical axis.

15. A submersible aircraft having a three-dimensional freedom of movement in the air and in the water and made by a process comprising:
    a. forming a frame;
    b. forming and operatively connecting a first rotating lifting rotor with said frame;
    c. forming and operatively connecting a second rotating lifting rotor with said frame;
    d. rotating said first rotor and said second rotor in opposite directions;
    e. operatively connecting a prime mover to said frame;

f. operatively connecting together said prime mover and said first rotor for rotating said first rotor;

g. operatively connecting together said prime mover and said second rotor for rotating said second rotor;

h. controlling the speed of rotation of said first rotor and said second rotor;

i. forming said first rotating lifting rotor to have an inner diameter;

j. forming said second rotating lifting rotor to have an outer diameter; and k. forming said outer diameter to be smaller than said inner diameter so as to allow said second rotating lifting rotor to be positioned inside of said first rotating lifting rotor.

16. An aircraft made by a process according to claim 15 and comprising:

a. operatively connecting and positioning moveable vanes with said frame for receiving the flow of fluid from a rotor to assist in moving the aircraft in a substantially horizontal direction; and, b. operatively connecting and positioning a turning vane with said frame for receiving the flow of fluid from a rotor to assist in moving the aircraft around a substantially vertical axis.

17. An aircraft made by a process according to claim 15 and comprising:

a. forming said first rotor to have a toroidal configuration to have a first circular inner rim and a second circular outer rim and a first aerofoil blade operatively connecting with said first inner rim and said second outer rim;

b. forming said second rotor to have a toroidal configuration to have a third circular inner rim and a fourth circular outer rim and a second aerofoil blade operatively connecting with said third inner rim and said fourth outer rim; and, c. forming said fourth outer rim to be of a smaller dimension than the dimension of said first inner rim.

18. An aircraft made by a process according to claim 15 and comprising:

a. forming and operatively connecting a third rotating diving rotor with said frame;

b. forming and operatively connecting a fourth rotating diving rotor with said frame;

c. rotating said third diving rotor and said fourth diving rotor in opposite directions;

d. controlling the speed of rotation of said third rotor and said fourth rotor; and e. operatively connecting together said prime mover and said third rotor and said fourth rotor for rotating said third rotor and for rotating said fourth rotor.

19. An aircraft made by a process according to claim 15 and comprising:

a. operatively connecting a marine propeller with said prime mover for propelling said aircraft in water;

b. incorporating a rudder in said aircraft for directing the course of movement of said aircraft in water;

c. forming a marine module;

d. attaching said marine module to said frame;

e. attaching said marine module in such a manner that the marine module can be released from said frame;

f. enclosing said marine module and operatively connecting with said third rotor and said fourth rotor, said marine propeller and said rudder;

g. forming said marine module with a nozzle-like tunnel;

h. positioning said marine propeller in said tunnel; and i. attaching said marine module to the lower part of said frame.

20. An aircraft made by a process according to claim 15 and comprising:

a. operatively connecting a turning vane with said frame and positioning said turning vane to receive the flow of fluid from a lifting rotor to assist in moving the aircraft around a substantially vertical axis.

21. An aircraft according to claim 1 and comprising:

a. each of said rotors having a self-adjusting blade;

b. each of said rotors having an inner rim;

c. a positioning shaft connecting with said inner rim;

d. an outer rim;

e. said positioning shaft connecting with said outer rim;

f. said blade being mounted on said positioning shaft in a manner to move lengthwise on said shaft and also to rotate around said shaft;

g. a yieldable means operatively connecting with said blade and urging said blade towards said inner rim; and, h. a guide operatively connecting with said blade to rotate the blade on the shaft as the blade moves toward the outer rim.

22. An aircraft according to claim 21 and comprising:

a. said guide comprising a recess in a rim and said recess defining a cam; and, b. a cam follower on said blade operatively connecting with said cam to cause the trailing edge of the blade to become lower in elevation as the blade moves toward the outer rim.

23. A process according to claim 9 and comprising:

a. forming each said rotors to have a self-adjusting blade;

b. forming each of said rotors to have an inner rim;

c. connecting a positioning shaft with said inner rim;

d. forming an outer rim;

e. connecting said positioning shaft with said outer rim;

f. mounting said blade on said positioning shaft in a manner to move lengthwise on said shaft and also to rotate around said shaft;

g. operatively connecting a yieldable means with said blade for urging said blade towards said inner rim; and, h. positioning a guide to operatively connect with said blade to rotate the blade on said shaft as the blade moves toward the outer rim.

24. A process according to claim 23 and comprising:

a. forming said rotor to comprise a recess in a rim to define a cam; and b. positioning a cam follower on said blade for operatively connecting with said cam to cause the trailing edge of said blade to become lower in elevation as the blade moves toward the outer rim.

25. An aircraft having a three-dimensional freedom of movement and made by a process according to claim 15 and comprising:

a. forming each said rotors to have a self-adjusting blade;

b. forming each of said rotors to have an inner rim;

c. connecting a positioning shaft with said inner rim;

d. forming an outer rim;

e. connecting said positioning shaft with said outer rim;

f. mounting said blade on said positioning shaft in a manner to move lengthwise on said shaft and also to rotate around said shaft;

g. operatively connecting a yieldable means with said blade for urging said blade towards said inner rim; and, h. positioning a guide to operatively connect with said blade to rotate the blade on said shaft as the blade moves toward the outer rim.

26. An aircraft made by a process according to claim 25 and comprising:

a. forming said outer rim to comprise a recess in a rim to define a cam; and b. positioning a cam follower on said blade for operatively connecting with said cam to cause the trailing edge of said blade to become lower in elevation as the blade moves toward the outer rim.

27. A rotor and a self-adjusting blade combination comprising:

a. said rotor having an inner rim;

b. a positioning shaft connecting with said inner rim;

c. an outer rim;

d. said positioning shaft connecting with said outer rim;

e. said blade being mounted on said positioning shaft in a manner to move lengthwise on said shaft and also to rotate around said shaft;

f. a yieldable means operatively connecting with said blade and urging said blade towards said inner rim; and, g. a guide operatively connecting with said blade to rotate the blade on the shaft as the blade moves toward the outer rim.

28. A process for making a rotor and a self-adjusting blade combination and comprising:

a. forming said rotor to have an inner rim;

b. connecting a positioning shaft with said inner rim;

c. forming an outer rim;

d. connecting said positioning shaft with said outer rim;

e. mounting said blade on said positioning shaft in a manner to move lengthwise on said shaft and also to rotate around said shaft;

f. operatively connecting a yieldable means with said blade for urging said blade towards said inner rim; and, g. positioning a guide to operatively connect with said blade to rotate the blade on said shaft as the blade moves toward the outer rim.

29. A combination of a rotor and a self-adjusting blade made by a process comprising:

a. forming said rotor to have an inner rim;

b. connecting a positioning shaft with said inner rim;

c. forming an outer rim;

d. connecting said positioning shaft with said outer rim;

e. mounting said blade on said positioning shaft in a manner to move lengthwise on said shaft and also to rotate around said shaft;

f. operatively connecting a yieldable means with said blade for urging said blade towards said inner rim; and, g. positioning a guide to operatively connect with said blade to rotate the blade on said shaft as the blade moves toward the outer rim.

30. An aircraft according to claim 3 and comprising:

a. said first circular inner rim and second circular outer rim comprising first aerofoil blade elements; and b. said first aerofoil blade elements being united by bonds to form said first rim and to form said second rim of said first rotor.

31. An aircraft according to claim 30 and comprising:

a. each said first inner rim having a first hub;

b. said adjacent first hubs being joined by said bond;

c. each said second outer rim having a second hub; and d. said adjacent second hubs being joined by said bond.

32. An aircraft according to claim 31 and comprising:

a. said third circular inner rim and said fourth circular outer rim comprising second aerofoil blade elements;

b. said second aerofoil blade elements being united by bonds to form said third rim and said fourth rim of said second rotor;

c. each said third inner rim having a third hub d. said adjacent third hubs being joined by said bond;

e. each said fourth outer rim having a fourth hub; and f. said adjacent fourth hubs being joined by said bond.

33. An aircraft according to claim 31 and comprising:

a. adjacent first hubs having a recess;

b. adjacent second hubs having a recess;

c. each recess having an outer passageway connecting with an enlarged inner part;

d. said bond having a body and enlarged ends; and e. said bond in a lateral cross-sectional view presenting the appearance of a dumbbell.

34. A process according to claim 11 and comprising:

a. forming said first circular inner rim and said second circular outer rim to comprise first aerofoil blade elements; and b. uniting said first aerofoil blade elements by bonds to form said first rim and to form said second rim of said first rotor.

35. A process according to claim 34 and comprising:

a. forming each said first inner rim to have a first hub;

b. joining said adjacent first hubs by said bond;

c. forming each said second outer rim to have a second hub; and d. joining said second adjacent hubs by said bond.

36. A process according to claim 35 and comprising:

a. forming said third circular inner rim and said fourth circular outer rim to comprise second aerofoil blade elements;

b. uniting said second aerofoil blade elements by bonds to form said third rim and said fourth rim;

c. forming each said third inner rim to have a third hub;

d. joining said adjacent third hubs by said bond;

e. forming each fourth outer rim to have a fourth hub; and f. joining said adjacent fourth hubs by said bond.

37. A process according to claim 35 and comprising:

a. forming adjacent first hubs with a recess;

b. forming adjacent second hubs with a recess;

c. forming each recess to have an outer passageway connecting with an enlarged inner part;

d. forming said bond to have a body and enlarged ends; and e. forming said bond to have in a lateral cross-sectional view the appearance of a dumbbell.

38. An aircraft made by a process according to claim 17 and comprising:

a. forming said first circular inner rim and said second circular outer rim to comprise first aerofoil blade elements; and b. uniting said first aerofoil blade elements by bonds to form said first rim and to form said second rim of said first rotor.

39. An aircraft made by a process according to claim 38 and comprising:
   a. forming each said first inner rim to have a first hub;
   b. joining said adjacent first hubs by said bond;
   c. forming each said second outer rim to have a second hub; and
   d. joining said second adjacent hubs by said bond.

40. An aircraft made by a process according to claim 39 and comprising:
   a. forming said third circular inner rim and said fourth circular outer rim to comprise second aerofoil blade elements;
   b. uniting said second aerofoil blade elements by bonds to form said third rim and said fourth rim of said second rotor;
   c. forming each said third inner rim to have a third hub;
   d. joining said adjacent third hubs by said bond;
   e. forming each fourth outer rim to have a fourth hub; and
   f. joining said adjacent fourth hubs by said bond.

41. An aircraft made by a process according to claim 39 and comprising:
   a. forming adjacent first hubs with a recess;
   b. forming adjacent second hubs with a recess;
   c. forming each recess to have an outer passageway connecting with an enlarged inner part;
   d. forming said bond to have a body and enlarged ends; and
   e. forming said bond to have in a lateral cross-sectional view the appearance of a dumbbell.

42. An aircraft according to claim 1 and comprising:
   a. said prime mover being a nuclear powered prime mover.

43. An aircraft according to claim 1 and comprising:
   a. said first means being a magnetic drive.

44. An aircraft according to claim 1 and comprising:
   a. said first means being a hydraulic drive.

45. An aircraft according to claim 1 and comprising:
   a. said first means being an electrical drive.

46. An aircraft according to claim 1 and comprising:
   a. said first means being a mechanical drive.

47. A process for making an aircraft according to claim 9 and comprising:
   a. selecting as said prime mover a nuclear powered prime mover.

48. A process according to claim 9 and comprising:
   a. operatively connecting together said prime mover and said first rotor by means of a magnetic drive for rotating said first rotor.

49. A process according to claim 9 and comprising:
   a. operatively connecting together said prime mover and said first rotor by means of a hydraulic drive for rotating said first rotor.

50. A process according to claim 9 and comprising:
   a. operatively connecting together said prime mover and said first rotor by means of an electrical drive for rotating said first rotor.

51. A process according to claim 9 and comprising:
   a. operatively connecting together said prime mover and said first rotor by means of a mechanical drive for rotating said first rotor.

52. An aircraft made by a process according to claim 15 and comprising:
   a. selecting as said prime mover a nuclear powered prime mover.

53. An aircraft made by a process according to claim 15 and comprising:
   a. operatively connecting together said prime mover and said first rotor by means of a magnetic drive for rotating said first rotor.

54. An aircraft made by a process according to claim 15 and comprising:
   a. operatively connecting together said prime mover and said first rotor by means of a hydraulic drive for rotating said first rotor.

55. An aircraft made by a process according to claim 15 and comprising:
   a. operatively connecting together said prime mover and said first rotor by means of an electrical drive for rotating said first rotor.

56. An aircraft made by a process according to claim 15 and comprising:
   a. operatively connecting together said prime mover and said first rotor by means of a mechanical drive for rotating said first rotor.

57. An aircraft according to claim 1 and comprising:
   a. said first rotating lifting rotor having a first toothed inner rim;
   b. said second rotating lifting rotor having a second toothed outer rim;
   c. a gear means operatively connecting with said first toothed inner rim and with said second toothed outer rim;
   d. said first means operatively connecting together said prime mover and said first rotor for rotating said first rotor comprising said gear means; and
   e. a second means operatively connecting together said prime mover and said second rotor for rotating said second rotor comprising said gear means.

58. An aircraft according to claim 1 and comprising:
   a. said first rotating lifting rotor having a first toothed inner rim;
   b. said second rotating lifting rotor having a second toothed outer rim;
   c. a first gear means operatively connecting with said first toothed inner rim and with said second toothed outer rim;
   d. said first rotating lifting rotor having a third toothed outer rim;
   e. a second gear means operatively connecting with said third toothed outer rim;
   f. said first means operatively connecting together said prime mover and said first rotor for rotating said first rotor comprising said second gear means; and
   g. a second means operatively connecting together said prime mover and said second rotor for rotating said second rotor.

59. An aircraft according to claim 1 and comprising:
   a. a housing on the lower part of said aircraft;
   b. said housing comprising a first hood;
   c. a first hinge means operatively connecting said first hood to said aircraft for rotation of said first hood with respect to said aircraft;
   d. a first actuator connecting with said first hood and with said aircraft for rotating said first hood;

e. a first wheel operatively connecting with said first hood for contact with the ground;

f. with said first hood positioned away from the lower part of said aircraft the housing is open and the first wheel is in a position to contact the ground; and g. with said first hood positioned underneath the aircraft there is said housing in an enclosed position for submersion of the aircraft in the water.

60. An aircraft according to claim 59 and comprising:

a. said housing comprising a second hood;

b. a second hinge means operatively connecting said second hood to said aircraft for rotation of said second hood with respect to said aircraft;

c. a second actuator operatively connecting with said second hood and said aircraft for rotation of said second hood;

d. a second wheel operatively connecting with said second hood for contact with the ground;

e. with said second hood positioned away from the lower part of said aircraft the housing is open and the second wheel is in a position to contact the ground; and f. with said first hood and said second hood positioned underneath the aircraft there is said housing in an enclosed position for submersion of the aircraft in water.

61. An aircraft according to claim 60 and comprising:

a. said first wheel and a third wheel operatively connecting with said first hood for contact with the ground; and b. said second wheel and a fourth wheel operatively connecting with said second hood for contact with the ground.

62. An aircraft according to claim 1 and comprising:

a. a housing on the lower part of said aircraft;

b. a nozzle in said housing; and c. a propeller in said housing for propelling said aircraft.

63. An aircraft according to claim 1 and comprising:

a. a housing on the lower part of said aircraft;

b. a nozzle in said housing; and c. a rudder operatively connecting with said housing for guiding said aircraft.

64. An aircraft according to claim 1 and comprising:

a. a housing on the lower part of said aircraft;

b. a nozzle in said housing;

c. a propeller in said housing for propelling said aircraft; and d. a rudder operatively connecting with said housing for guiding said aircraft.

65. An aircraft according to claim 1 and comprising:

a. an upper hood attached to the upper part of the frame; and b. said upper hood functioning as a housing for a balloon/parachute combination for emergency landing of the aircraft.

66. An aircraft according to claim 1 and comprising:

a. a protective rim operatively connecting with said frame; and b. said protective rim encircling said first rotating lifting rotor and said second rotating lifting rotor.

67. A process for making a submersible aircraft according to claim 9 and comprising:

a. forming said first rotating lifting rotor with a first toothed inner rim;

b. forming said second rotating lifting rotor with a second toothed outer rim;

c. operatively connecting a gear means with said first toothed inner rim and with said second toothed outer rim;

d. using said first means to operatively connect together said prime mover and said first rotor for rotating said first rotor, and comprising said gear means; and e. using said second means to operatively connect together said prime mover and said second rotor for rotating said second rotor, and comprising said gear means.

68. A process for making a submersible aircraft according to claim 9 and comprising:

a. forming said first rotating lifting rotor with a first toothed inner rim;

b. forming said second rotating lifting rotor with a second toothed outer rim;

c. operatively connecting a first gear means with said first toothed inner rim and with said second toothed outer rim;

d. forming said first rotating lifting rotor with a third toothed outer rim;

e. operatively connecting a second gear means with said third toothed outer rim;

f. using said first means to operatively connect together said prime mover and said first rotor for rotating said first rotors, and comprising said second gear means; and g. using said second means to operatively connect together said prime mover and said second rotor for rotating said second rotor, and comprising said first gear means.

69. A process for making a submersible aircraft according to claim 9 and comprising:

a. forming a housing on the lower part of said aircraft;

b. forming said housing to comprise a first hood;

c. operatively connecting said first hood by a first hinge means to said aircraft for rotation of said first hood with respect to said aircraft;

d. connecting a first actuator with said first hood and with said aircraft for rotation of said first hood;

e. operatively connecting a first wheel with said first hood for contact with the ground;

f. positioning said first hood away from the lower part of said aircraft to open the housing so that the first wheel is in a position to contact the ground; and g. positioning said first hood underneath said aircraft to enclose said housing for submersion of said aircraft in the water.

70. A process for making a submersible aircraft according to claim 69 and comprising:

a. forming said housing to comprise a second hood;

b. operatively connecting said second hood by a second hinge means to said aircraft for rotation of said second hood with respect to said aircraft;

c. connecting a second actuator with said second hood and with said aircraft for rotation of said second hood;

d. operatively connecting a second wheel with said second hood for contact with the ground;

e. positioning said second hood away from the lower part of said aircraft to open the housing so that the second wheel is in a position to contact the ground; and f. positioning said second hood underneath said aircraft to enclose said housing for submersion of said aircraft in the water.

71. A process for making a submersible aircraft according to claim 70 and comprising:
   a. operatively connecting said first wheel and a third wheel with said first hood for contact with the ground; and
   b. operatively connecting said second wheel and a fourth wheel with said second hood for contact with the ground.

72. A process for making a submersible aircraft according to claim 9 and comprising:
   a. forming a housing on the lower part of said aircraft;
   b. positioning a nozzle in said housing; and
   c. operatively connecting a propeller with said housing for propelling said aircraft.

73. A process for making a submersible aircraft according to claim 9 and comprising:
   a. forming a housing on the lower part of said aircraft;
   b. positioning a nozzle in said housing; and
   c. operatively connecting a rudder with said housing for guiding said aircraft.

74. A process for making a submersible aircraft according to claim 9 and comprising:
   a. forming a housing on the lower part of said aircraft;
   b. positioning a nozzle in said housing;
   c. operatively connecting a propeller with said housing for propelling said aircraft; and
   d. operatively connecting a rudder with said housing for guiding said aircraft.

75. A process for making a submersible aircraft according to claim 9 and comprising:
   a. attaching an upper hood to the upper part of the frame; and
   b. positioning a balloon/parachute combination in said hood for emergency landing of the aircraft.

76. A process for making a submersible aircraft according to claim 9 and comprising:
   a. operatively connecting a protective rim with said frame; and
   b. said protective rim encircling said first rotating lifting rotor and said second rotating lifting rotor.

77. A submersible aircraft according to claim 15 and comprising:
   a. forming said first rotating lifting rotor with a first toothed inner rim;
   b. forming said second rotating lifting rotor with a second toothed outer rim;
   c. operatively connecting a gear means with said first toothed inner rim and with said second toothed outer rim;
   d. using said first means to operatively connect together said prime mover and said first rotor for rotating said first rotor, and comprising said gear means; and
   e. using said second means to operatively connect together said prime mover and said second rotor for rotating said second rotor, and comprising said gear means.

78. A submersible aircraft according to claim 15 and comprising:
   a. forming said first rotating lifting rotor with a first toothed inner rim;
   b. forming said second rotating lifting rotor with a second toothed outer rim;
   c. operatively connecting a first gear means with said first toothed inner rim and with said second toothed outer rim;
   d. forming said first rotating lifting rotor with a third toothed outer rim;
   e. operatively connecting a second gear means with said third toothed outer rim;
   f. using said first means to operatively connect together said prime mover and said first rotor for rotating said first rotor, and comprising said second gear means; and
   g. using said second means to operatively connect together said prime mover and said second rotor for rotating said second rotor, and comprising said second gear means.

79. A submersible aircraft according to claim 15 and comprising:
   a. forming a housing on the lower part of said aircraft;
   b. forming said housing to comprise a first hood;
   c. operatively connecting said first hood by a first hinge means to said aircraft for rotation of said first hood with respect to said aircraft;
   d. connecting a first actuator with said first hood and with said aircraft for rotation of said first hood;
   e. operatively connecting a first wheel with said first hood for contact with the ground;
   f. positioning said first hood away from the lower part of said aircraft to open the housing so that the first wheel is in a position to contact the ground; and
   g. positioning said first hood underneath said aircraft to enclose said housing for submersion of said aircraft in the water.

80. A submersible aircraft according to claim 79 and comprising:
   a. forming said housing to comprise a second hood;
   b. operatively connecting said second hood by a second hinge means to said aircraft for rotation of said second hood with respect to said aircraft;
   c. connecting a second actuator with said second hood and with said aircraft for rotation of said second hood;
   d. operatively connecting a second wheel with said second hood for contact with the ground;
   e. positioning said second hood away from the lower part of said aircraft to open the housing so that the second wheel is in a position to contact the ground; and
   f. positioning said second hood underneath said aircraft to enclose said housing for submersion of said aircraft in the water.

81. A submersible aircraft according to claim 80 and comprising:
   a. operatively connecting said first wheel and a third wheel with said first hood for contact with the ground; and
   b. operatively connecting said second wheel and a fourth wheel with said second hood for contact with the ground.

82. A submersible aircraft according to claim 15 and comprising:
   a. forming a housing on the lower part of said aircraft;
   b. positioning a nozzle in said housing; and
   c. operatively connecting a propeller with said housing for propelling said aircraft.

83. A submersible aircraft according to claim 15 and comprising:
 a. forming a housing on the lower part of said aircraft;
 b. positioning a nozzle in said housing; and
 c. operatively connecting a rudder with said housing for guiding said aircraft.

84. A submersible aircraft according to claim 15 and comprising:
 a. forming a housing on the lower part of said aircraft;
 b. positioning a nozzle in said housing;
 c. operatively connecting a propeller with said housing for propelling said aircraft;
 d. operatively connecting a rudder with said housing for guiding said aircraft.

85. A submersible aircraft according to claim 15 and comprising:
 a. attaching an upper hood to the upper part of the frame; and
 b. positioning a balloon/parachute combination in said hood for emergency landing of the aircraft.

86. A submersible aircraft according to claim 15 and comprising:
 a. operatively connecting a protective rim with said frame; and
 b. said protective rim encircling said first rotating lifting rotor and said second rotating lifting rotor.

* * * * *